United States Patent
Takagi

(10) Patent No.: US 9,812,820 B2
(45) Date of Patent: Nov. 7, 2017

(54) ELECTRICAL CONNECTOR AND RETURNING JIG

(71) Applicant: Japan Aviation Electronics, Limited, Tokyo (JP)

(72) Inventor: Youhei Takagi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 15/142,296

(22) Filed: Apr. 29, 2016

(65) Prior Publication Data

US 2017/0018888 A1    Jan. 19, 2017

(30) Foreign Application Priority Data

Jul. 14, 2015   (JP) ................................. 2015-140712

(51) Int. Cl.
| | | |
|---|---|---|
| *H01R 13/70* | (2006.01) | |
| *B60L 11/18* | (2006.01) | |
| *H01R 13/627* | (2006.01) | |
| *H01R 13/713* | (2006.01) | |

(52) U.S. Cl.
CPC ........ *H01R 13/701* (2013.01); *B60L 11/1818* (2013.01); *H01R 13/6275* (2013.01); *H01R 13/713* (2013.01); *H01R 2201/26* (2013.01)

(58) Field of Classification Search
CPC   H01R 13/713; H01R 13/7039; H01R 13/703; H01R 13/70; H01R 13/6275
USPC ................................................. 439/188, 352
See application file for complete search history.

(56) References Cited

U.S. PATENT DOCUMENTS

| | | | |
|---|---|---|---|
| 9,106,015 B2 * | 8/2015 | Ohmura ............. | H01R 13/6275 |
| 9,263,830 B2 * | 2/2016 | Sugiyama ........... | B60L 11/1818 |
| 2012/0108097 A1 * | 5/2012 | Takagi ............... | H01R 13/6275 |
| | | | 439/345 |

FOREIGN PATENT DOCUMENTS

JP          5659444 B2     1/2015

\* cited by examiner

*Primary Examiner* — Tulsidas C Patel
*Assistant Examiner* — Marcus Harcum
(74) *Attorney, Agent, or Firm* — Collard & Roe, P.C.

(57) ABSTRACT

A connector includes: a locking lever; a switching mechanism that includes a switch configured to generate a signal capable of establishing conduction between the connector and an inlet when operated by the locking lever and is arranged so as to be movable between a first position and a second position; an outer shell configured to accommodate the locking lever and the switch therein; a cover including a cover-side protrusion and being arranged on the outer shell so that at least a part of the cover is exposed to an outside of the outer shell; and a movable-plate-side protrusion arranged in the switching mechanism and configured to retain the switching mechanism at the first position through contact with the cover-side protrusion. The locking lever includes an operating portion capable of operating the switch.

8 Claims, 23 Drawing Sheets

ELECTRICAL CONNECTOR AND RETURNING JIG

This application is based upon and claims, the benefit of priority from Japanese Patent Application No. 2015-140712, filed on Jul. 14, 2015, the disclosure of which is incorporated herein in its entirety by reference.

TECHNICAL FIELD

This invention relates to an electrical connector and a returning jig.

BACKGROUND ART

In the fitting structure between a connector and an inlet of an electrical connector unit, there may be arranged a locking portion configured to prevent the connector from slipping out of the inlet when the connector reaches a predetermined fitting position.

Further, in this structure, there is also needed a releasing portion, e.g., a release button, which is configured to release locking of the locking portion when the connector is disengaged from the inlet.

In this structure, the locking may not be released by the releasing portion due to breakage of the releasing portion, and to a foreign matter that intrudes into the connector to be caught in the locking portion.

Accordingly, in this structure, there is also needed the structure (hereinafter referred to as urgent disengaging structure) for disengaging the connector from the inlet after forcibly releasing the locking without using the releasing portion.

As disclosed in, for example, Japanese Patent No. 5659444 (hereinafter referred to as Patent Document 1), as the urgent disengaging structure, there is proposed the structure for releasing locking in such a manner that a shaft configured to retain a locking lever to a cover of the connector is pulled out of the cover from an outside.

This structure is specifically described with reference to FIG. 24.

As illustrated in FIG. 24, a vehicle charging connector 100 disclosed in Patent Document 1 includes a first rocking arm 10 including a disengagement preventing hook 11 configured to lock a fitting state between the connector and a vehicle-side inlet, and a slide switch 4 configured to release locking of the first rocking arm 10. Further, the first rocking arm 10 is rotatably retained by a shaft 13 to a cover of the vehicle charging connector 100. In addition, the shaft 13 can be mounted and dismounted from the outside.

In this structure, when the slide switch 4 cannot release locking of the disengagement preventing hook 11, the shaft 13 is pulled out of the cover, thereby releasing retention of the first rocking arm 10 to the cover. Thus, the disengagement preventing hook 11 is disengaged from the vehicle-side inlet so that the locking is forcibly released.

SUMMARY OF THE INVENTION

However, in the structure disclosed in Patent Document 1, when pulling the shaft 13 out of the cover, that is, when forcibly releasing the locking, conduction may be established between the vehicle charging connector 100 and the vehicle-side inlet. Accordingly, there is a problem in that an electric leakage and an electric shock may be caused when forcibly releasing the locking.

This invention has been made in view of the above-mentioned problems, and has an object to provide an electrical connector capable of being forcibly released more safely than in the related art.

As one aspect of the present invention, an electrical connector, comprising: a locking lever, which is rotatable and configured to lock a fitting state between the electrical connector and a mating connector; a switching mechanism, which is arranged so as to be movable between a first position and a second position, the switching mechanism comprising a switch that generates a signal capable of establishing conduction between the electrical connector and the mating connector when operated by the locking lever, and that one of generates a signal for interrupting the conduction between the electrical connector and the mating connector, and does not generate the signal capable of establishing the conduction between the electrical connector and the mating connector under a state in which the switch is not operated by the locking lever; a shell, which is configured to accommodate the locking lever and the switching mechanism therein; a cover comprising a cover-side retaining portion, the cover being arranged on the shell so that at least a part of the cover is exposed to an outside of the shell; and a switch-side retaining portion, which is arranged in the switching mechanism and configured to retain the switching mechanism at the first position through contact with the cover-side retaining portion is provided. The locking lever comprises: a rotation shaft defining a center of rotation; a locking portion to be brought into contact with the mating connector; and an operating portion, which is arranged on an opposite side of the locking portion across the rotation shaft, and is capable of operating the switch. When the switching mechanism is located at the first position, the locking lever is rotated so that the operating portion is capable of operating the switch. When the cover-side retaining portion and the switch-side retaining portion are in a non-contact state, the switching mechanism is arranged at the second position. When the switching mechanism is located at the second position, the operating portion is incapable of operating the switch.

The switching mechanism may comprise: a movable plate arranged on the switch; and a movable-plate-side protrusion formed on the movable plate and serving as the switch-side retaining portion to be brought into contact with the cover, and the cover-side retaining portion may comprise a cover-side protrusion to be brought into contact with the movable-plate-side protrusion.

The electrical connector may further comprise: a spring arranged on the movable plate and configured to apply a force to the movable plate from the first position to the second position; a stationary plate arranged on the shell and configured to retain the spring; and a movable-plate retaining shaft configured to rotatably retain the movable plate on the shell.

The switch may comprise a spring piece, wherein, when the spring piece is pressed by the operating portion, the switch generates the signal capable of establishing the conduction between the electrical connector and the mating connector, and wherein, under a state in which the spring piece is not pressed by the operating portion, the switch one of generates the signal for interrupting the conduction between the electrical connector and the mating connector, and does not generate the signal capable of establishing the conduction between the electrical connector and the mating connector.

The shell may have a forcibly releasing jig insertion hole formed in an end portion of the shell on a side opposite to a direction in which the electrical connector is fitted to the mating connector, and the cover may be mounted to the shell so as to cover the forcibly releasing jig insertion hole, and may be dismountable from the shell by being moved in a direction opposite to the direction in which the electrical connector is fitted to the mating connector.

When the cover-side retaining portion and the switch-side retaining portion are in a non-contact state, the locking lever may be located at a position at which the locking lever is visually recognizable through the forcibly releasing jig insertion hole.

The movable plate may comprise a guide portion serving as a guide when the switching mechanism is moved from the second position to the first position, and the shell may have a returning hole that enables the guide portion to be visually recognized from the outside of the shell when the switching mechanism is located at the second position. In this case, a returning jig, comprising: an insertion portion having a shaft shape to be inserted into the returning hole of the electrical connector; and a plate-like key portion, which is formed at a distal end portion of the insertion portion so as to protrude in a radial direction of the insertion portion, and is configured to be brought into contact with the guide portion when inserted into the returning hole, wherein, under a state in which the switching mechanism is located at the second position, the insertion portion is inserted into the returning hole so that the plate-like key portion is brought into contact with the guide portion, and wherein the plate-like key portion is rotated to press the guide portion toward the first position so that the switching mechanism is arrangeable at the first position is further provided.

According to this invention, it is possible to provide the electrical connector capable of being forcibly released more safely than in the related art.

MODE FOR CARRYING OUT THE INVENTION

An exemplary embodiment of this invention is described in detail below with reference to the drawings.

Figure 1:
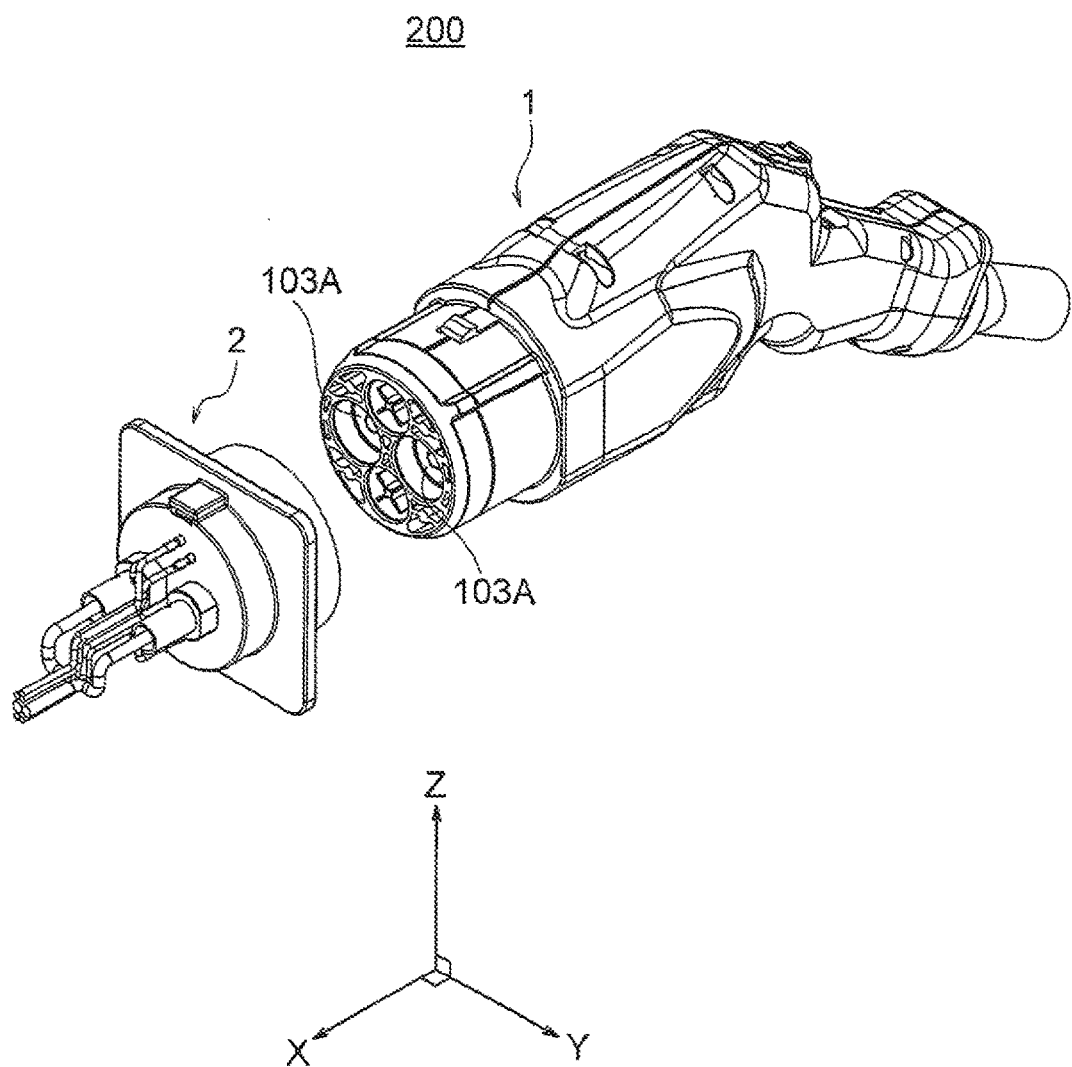
FIG. 1 is a perspective view of a connector unit 200 according to an embodiment of this invention.
Figure 2:
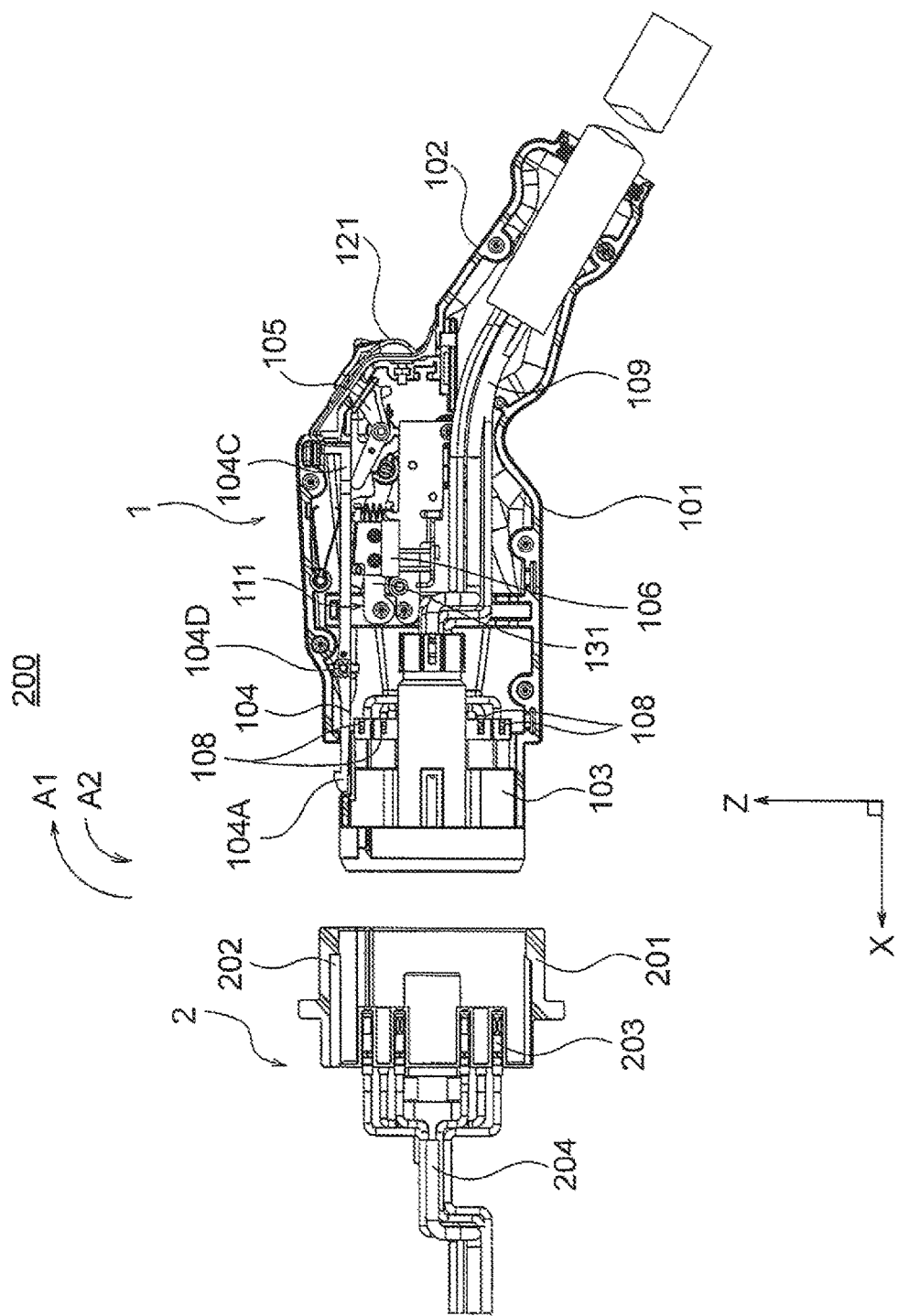
FIG. 2 is a side view (partial sectional view) of the connector unit 200 of FIG. 1 when viewed from a positive orientation side in a Y direction.

First, with reference to FIG. 1 and FIG. 2, an outline of a connector unit 200 (electrical connector unit) according to a first embodiment is described.

As the connector unit 200, a connector unit for a battery charger for an electric vehicle is exemplified.

In the followind description, directions of each component are indicated through use of an orthogonal coordinate system. As illustrated in FIG. 1, an X direction, a Y direction orthogonal to the X direction, and a Z direction orthogonal to the X direction and the Y direction are defined as three directions in the orthogonal coordinate system.

In the X direction, the Y direction, and the Z direction, orientations indicated by the arrows of FIG. 1 are defined as "positive orientations", and orientations opposite to the orientations indicated by the arrows of FIG. 1 are defined as "negative orientations".

As illustrated in FIG. 1 and FIG. 2, the connector unit 200 includes a connector 1 being an electrical connector, and an inlet 2 being a mating connector to be fitted to the connector 1.

The connector 1 is a connector arranged on a battery charger side, whereas the inlet 2 is a connector arranged on an electric vehicle side.

As illustrated in FIG. 1 and FIG. 2, the connector 1 includes a locking lever 104, a switching mechanism 111, an outer shell 101, and a cover 121. The locking lever 104 is rotatable, and is configured to lock a fitting state between the inlet 2 and the connector 1. The switching mechanism 111 is arranged so as to be movable between a first position P1 and a second position P2 (see FIG. 5), and includes a switch 106. The switch 106 generates a signal capable of establishing conduction between the connector 1 and the inlet 2 when operated by the locking lever 104 (pressed by the locking lever 104 in this case). The switch 106 generates a signal for interrupting the conduction between the connector 1 and the inlet 2, or does not generate the signal capable of establishing the conduction between the connector 1 and the inlet 2 under a state in which the switch 106 is not operated by the locking lever 104. The outer shell 101 serves as a shell configured to accommodate the locking lever 104 and the switch 106 therein. The cover 121 is arranged on the outer shell 101 so that at least a part of the cover 121 is exposed to an outside of the outer shell 101 (arranged on an outer side of the outer shell 101 so as to be mountable to and dismountable from the switching mechanism 111 in this case). The cover 121 includes a cover-side protrusion 155 serving as a cover-side retaining portion configured to retain the switching mechanism 111 at the first position P1.

Further, the switching mechanism 111 includes a movable-plate-side protrusion 133 (see FIG. 4) being a switch-side retaining portion configured to retain the switching mechanism 111 at the first position P1 through contact with the cover-side protrusion 155.

Further, the locking lever 104 includes a rotation shaft 104D defining a center of rotation, a claw-like locking portion 104A to be brought into contact with the inlet 2, and an operating portion 104C that is arranged on an opposite side of the locking portion 104A across the rotation shaft 104D, and is capable of operating the switch 106.

Next, with reference to FIG. 2 to FIG. 6, details of the structure of the connector 1 and the inlet 2 are described.

As illustrated in FIG. 2, the connector 1 includes the outer shell 101, a grip 102 arranged at one end of the outer shell 101 and configured to enable an operator to hold the connector 1 during charging, an inner housing 103 configured to accommodate contacts 108 therein and arranged inside the outer shell 101 so that an end portion of the inner housing 103 is exposed, a cable 109 arranged inside the outer shell 101 and connected to the contacts 108, the locking lever 104 arranged inside the outer shell 101 and configured to lock the fitting state between the connector 1 and the inlet 2 during fitting (during charging), the switch 106 connected to the cable 109 and configured to detect halfway fitting of the locking lever 104, and a release lever 105 being a releasing portion configured to release locking of the locking lever 104.

Meanwhile, as illustrated in FIG. 2, the inlet 2 includes a tubular housing 201 into which the connector 1 is to be inserted, a recessed inlet-side locking portion 202 arranged on an inner periphery of the housing 201 and to be brought into contact with the locking portion 104A of the locking lever 104 during locking, contacts 203 to be electrically connected to the contacts 108 of the connector 1, respectively, and arranged in the housing 201 so that end portions of the contacts 203 are exposed, and a cable 204 connected to the contacts 203.

Figure 3:
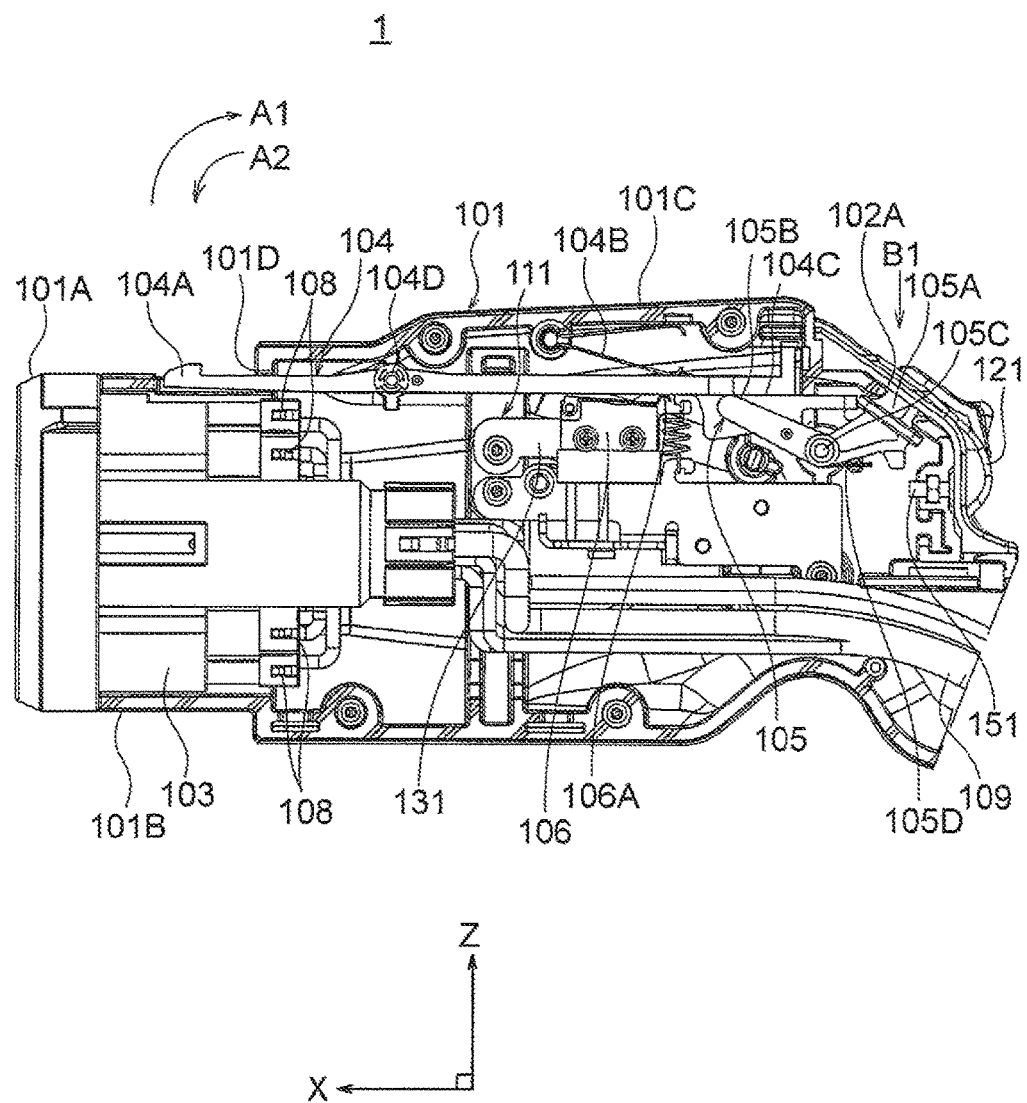
FIG. 3 is an enlarged view of a vicinity of an outer shell 101 of a connector 1 of FIG. 2.

The outer shell 101 is an outer cover of the connector 1. As illustrated in FIG. 3, the outer shell 101 includes a tubular large-diameter portion 101C and a tubular small-diameter portion 101B. The small-diameter portion 101B is formed at a distal end of the large-diameter portion 101C in the positive orientation of the X direction, has a diameter smaller than that of the large-diameter portion 101C, and is coaxial with the large-diameter portion 101C.

A distal end 101A of the small-diameter portion 101B is chamfered.

The inner housing 103 is an insulating member having a cylindrical shape conforming to an inner peripheral shape of the small-diameter portion 101B, and is arranged in the small-diameter portion 101B.

An end portion of the inner housing 103 is exposed to an outside, and recesses 103A are formed in the end portion of the inner housing 103 (see FIG. 1). The contacts 108 are fixed in the recesses 103A.

The locking lever 104 is a rod-like member arranged in the large-diameter portion 101C so as to extend in a direction in which the connector is fitted to the inlet 2 (X direction). The locking lever 104 is retained by the rotation shaft 104D so as to be rotatable in directions indicated by the arrows A1 and A2 of FIG. 3 that is, the locking porton 104A is rotatable in outward and inward directions of the outer shell 101.

The rotation shaft 104D is fixed to an inner wall of the large-diameter portion 101C of the outer shell 101 so as to extend in a direction crossing an axial direction of the outer shell 101 (Y direction in this case).

The locking lever 104 includes the claw-like locking portion 104A formed at an end portion thereof in the positive orientation of the X direction.

In FIG. 3, the locking portion 104A is formed to protrude to an upper side of the locking lever 104, that is, protrude from the outer shell 101 of the connector 1 in the positive orientation of the Z direction. The locking portion 104A has a claw-like shape to be brought into contact with the inlet-side locking portion 202 of the inlet 2.

Further, the locking lever 104 is arranged inside the large-diameter portion 101C of the outer shell 101, but at least the locking portion 104A is exposed to the outside.

More specifically, the locking portion 104A is exposed to the outside from an opening portion 101D formed in a coupling portion between the large-diameter portion 101C and the small-diameter portion 101B.

A portion of the locking lever 104, which is located on the opposite side of the locking portion 104A across the rotation shaft 104D, constructs the operating portion 104C to be brought into contact with the release lever 105 and the switch 106. The operating portion 104C is arranged inside the large-diameter portion 101C.

In addition, a V-shaped flat spring 104B is arranged between the large-diameter portion 101C and the operating portion 104C on the positive orientation side of the operating portion 104C in the Z direction. The flat spring 104B applies a rotational force to the locking lever 104 in a direction in which the locking portion 104A is rotated to the outer side of the connector 1 (in the direction indicated by the arrow A1 of FIG. 3).

Meanwhile, when a surface of the locking lever 104 in the positive orientation of the Z direction, which is close to the locking portion 104A, is brought into contact with the opening portion 101D, the locking lever 104 is inhibited from being further rotated in the direction indicated by the arrow A1.

Figure 14:
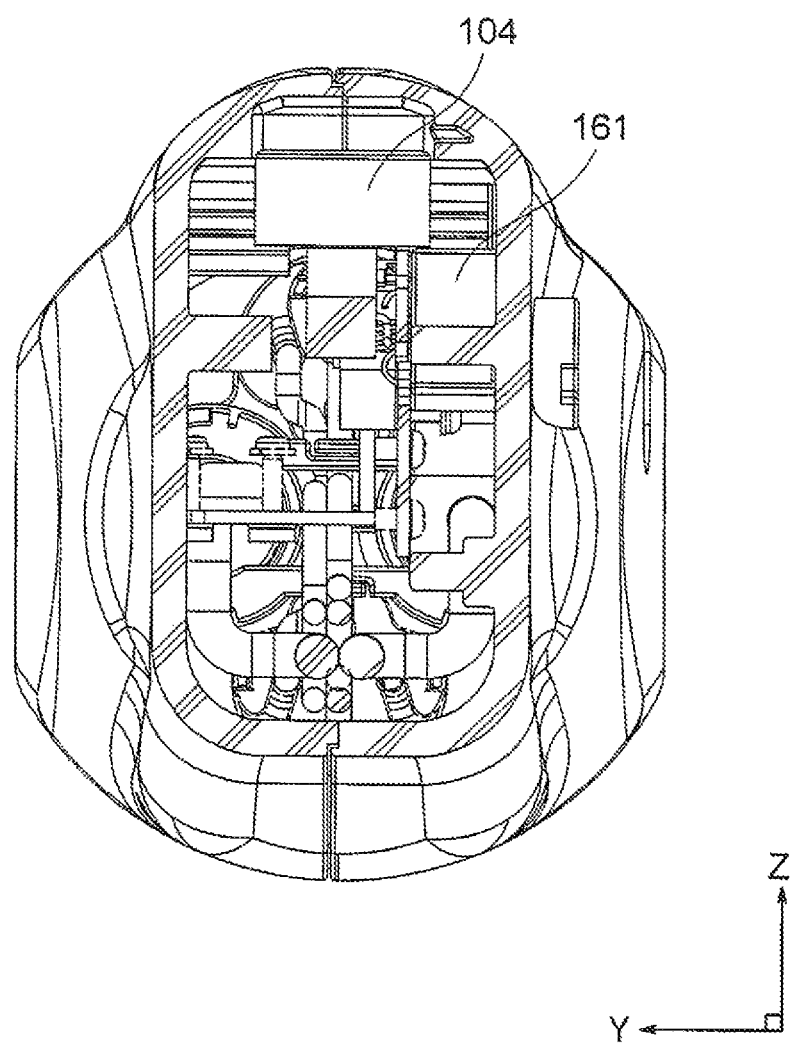
FIG. 14 is a sectional view taken along the line 14-14 of FIG. 13.

When a surface of the operating portion 104C in the negative orientation of the Z direction is brought into contact with a locking-lever stopper 161 that is formed so as to protrude from the large-diameter portion 101C in the positive orientation of the Y direction, an end portion of the locking lever 104 on the operating portion 104C side is inhibited from being further rotated in the direction indicated by the arrow A1 (see FIG. 14).

The switching mechanism 111 is a member including the switch 106 that generates the signal capable of establishing the conduction between the connector 1 and the inlet 2 when operated by the locking lever 104, and that generates the signal for interrupting the conduction between the connector 1 and the inlet 2 or does not generate the signal capable of establishing the conduction between the connector 1 and the inlet 2 under a state in which the switch 106 is not operated by the locking lever 104. The switching mechanism 111 includes at least the switch 106, and a movable plate 131 configured to retain the switch 106.

The switch 106 is a switch including contacts (not shown). The switch 106 is electrically connected to a control unit of a battery charger (not shown) through the cable 109. The switch 106 includes a spring piece 106A. When the spring piece 106A is pressed by the operating portion 104C of the locking lever 104, the switch 106 generates the signal capable of establishing the conduction between the connector 1 and the inlet 2, and sends the signal to the battery charger (not shown) through the cable 109. Meanwhile, when pressing of the spring piece 106A is released, the switch 106 generates the signal for interrupting the conduction between the connector 1 and the inlet 2, or does not generate the signal capable of establishing the conduction between the connector 1 and the inlet 2.

Figure 4:
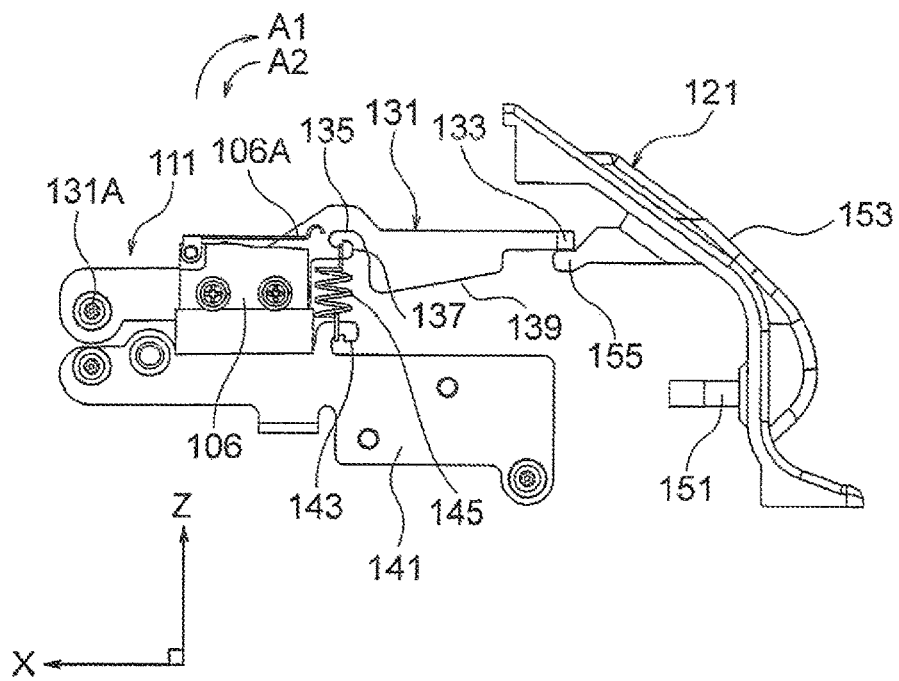
FIG. 4 is a view for illustrating only a movable plate 131, a stationary plate 141, a coil spring 145, a switch 106, and a cover 121 of FIG. 3.
Figure 5:
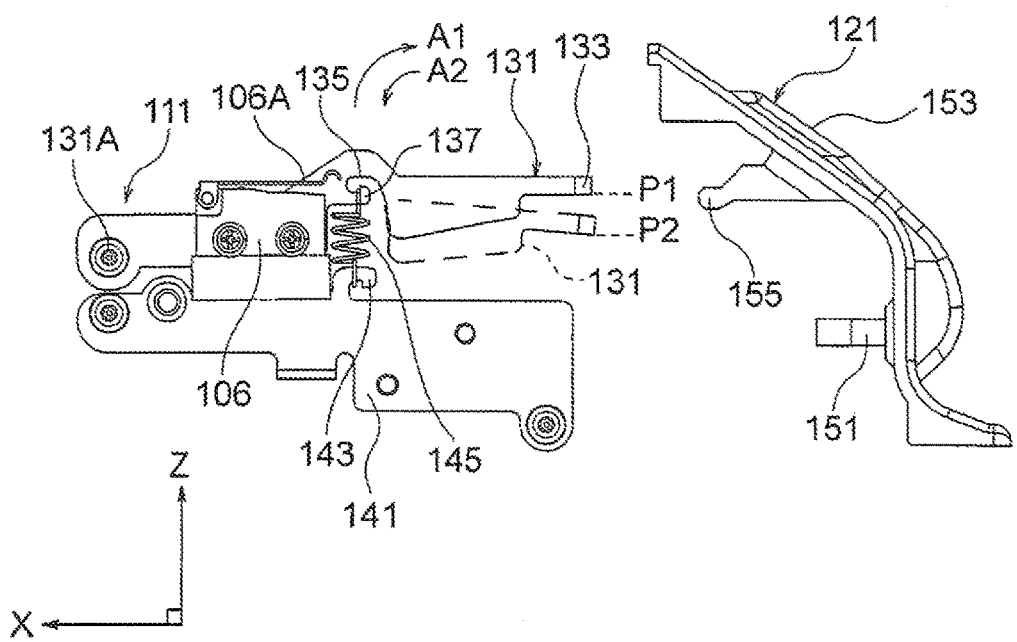
FIG. 5 is a view for illustrating a state in which a cover-side protrusion 155 of the cover 121 is disengaged from a movable-plate-side protrusion 133 from the state illustrated in FIG. 4.
Figure 6:
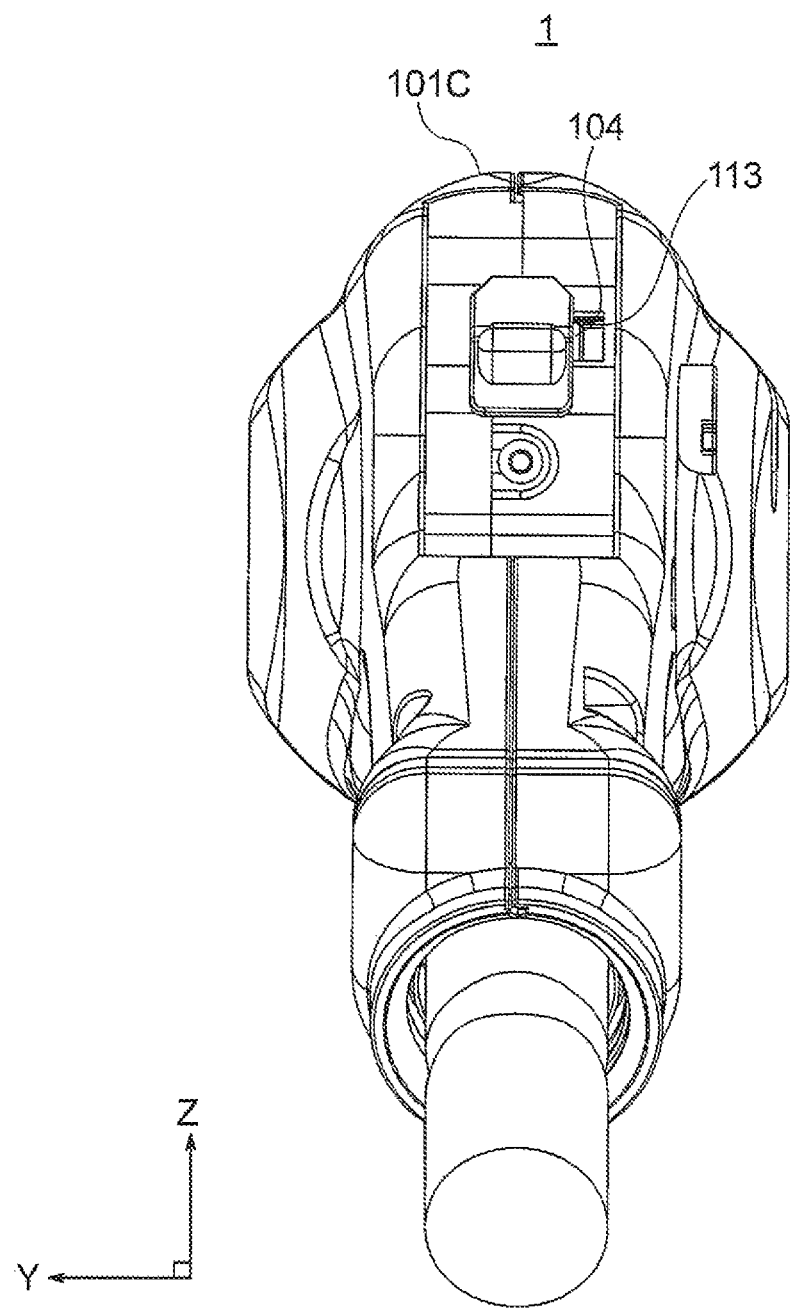
FIG. 6 is a back view of the connector 1 of FIG. 1 when viewed from a positive orientation side in an X direction, for illustrating a state in which the cover 121 is dismounted.

As illustrated in FIG. 4 and FIG. 5, the switch 106 is retained on the movable plate 131 arranged inside the large-diameter portion 101C.

The movable plate 131 is a plate-like member having a surface parallel to an X-Z plane, and has an elongated plate-like shape extending in the X direction.

An end portion of the movable plate 131 in the positive orientation of the X direction is retained on the outer shell 101 so that the movable plate 131 is rotatable about a movable-plate retaining shaft 131A. The movable plate 131 is rotatable on the X-Z plane in directions indicated by the arrows A1 and A2 of FIG. 3 and FIG. 4. The movable-plate retaining shaft 131A is fixed to the inner wall of the large-diameter portion 101C of the outer shell 101 so as to extend in the Y direction.

At the end portion of the movable plate 131 in the negative orientation of the X direction, there is formed the movable-plate-side protrusion 133 to be brought into contact with the cover-side protrusion 155 of the cover 121.

The movable plate 131 includes a cutout portion 135 formed between the movable-plate retaining shaft 131A and the movable-plate-side protrusion 133 by cutting out the end portion of the movable plate 131 in the negative orientation of the Z direction toward the positive orientation of the Z direction.

A hook-shaped movable-plate-side hook portion 137 protruding toward the negative orientation of the X direction is formed in the cutout portion 135.

On an end surface of the movable plate 131 on the negative orientation side in the Z direction, a guide portion 139 is formed to extend obliquely from the cutout portion 135 to the movable-plate-side protrusion 133 in the positive orientation of the Z direction.

The switch 106 is arranged between the movable-plate retaining shaft 131A and the cutout portion 135.

Meanwhile, a stationary plate 141 is arranged on the outer shell 101 so as to be aligned with the movable plate 131 in the negative orientation of the Z direction. The stationary plate 141 is a plate-like member having a surface parallel to the X-Z plane. The stationary plate 141 is fixed to the outer shell 101, and is stationary unlike the movable plate 131.

Meanwhile, the stationary plate 141 includes a hook-shaped stationary-plate-side hook portion 143 protruding to the positive orientation side in the Z direction.

A coil spring 145 is arranged so as to couple the movable-plate-side hook portion 137 and the stationary-plate-side hook portion 143 to each other.

With this configuration, the movable plate 131 is always pulled to the stationary plate 141 side.

Meanwhile, the cover 121 is arranged at an end portion of the large-diameter portion 101C (end portion in the negative orientation of the X direction) opposite to the direction in which the connector 1 is fitted to the inlet 2. The cover 121 can be fixed to the large-diameter portion 101C with a cover fixing screw 151 arranged so as to pass through the cover 121 and the large-diameter portion 101C in the X direction (see FIG. 3).

That is, the cover 121 can be dismounted from the large-diameter portion 101C in such a manner that the cover fixing screw 151 is removed and then the cover 121 is moved in a direction opposite to the direction in which the connector 1 is fitted to the inlet 2 (negative orientation of the X direction).

The cover 121 is arranged so as to cover a forcibly releasing jig insertion hole 113 (see FIG. 6) formed in a rear end of the large-diameter portion 101C (end portion in the negative orientation of the X direction).

The forcibly releasing jig insertion hole 113 is formed at a position at which the locking lever 104 is visually recognizable through the forcibly releasing jig insertion hole 113 under a state in which the cover 121 is dismounted from the large-diameter portion 101C (state in which the cover-side protrusion 155 and the movable-plate-side protrusion 133 are not held in contact with each other).

As illustrated in FIG. 4, the cover 121 includes a lid-like cover body 153 configured to cover the large-diameter portion 101C, and the cover-side protrusion 155 protruding from the cover body 153 in the positive orientation of the X direction. The cover-side protrusion 155 is a member to be brought into contact with the movable-plate-side protrusion 133. The cover-side protrusion 155 is brought into contact with the movable-plate-side protrusion 133 from the negative orientation side of the movable-plate-side protrusion 133 in the Z direction. Thus, the cover-side protrusion 155 and the movable-plate-side protrusion 133 are brought into contact with each other.

In this state (state illustrated in FIG. 4), the movable plate 131 is pulled by the coil spring 145 to the stationary plate 141 side (in the negative orientation of the Z direction), whereas the end portion of the movable plate 131 on the positive orientation side in the X direction and the end portion thereof on the negative orientation side in the X direction are supported by the movable-plate retaining shaft 131A and the cover-side protrusion 155, respectively. Accordingly, the movable plate 131 is not moved from the state illustrated in FIG. 4. A position (positions of the movable plate 131 and the switch 106) of the switching mechanism 111 illustrated in FIG. 4 (and indicated by the solid line of FIG. 5) is referred to as the first position P1.

Meanwhile, in the state illustrated in FIG. 4, when the cover 121 is moved in the negative orientation of the X direction after, for example, dismounted from the large-diameter portion 101C, and then the cover-side protrusion 155 is disengaged from the movable-plate-side protrusion 133 (the cover-side protrusion 155 and the movable-plate-side protrusion 133 are brought into a non-contact state), the movable plate 131 is pulled by the coil spring 145 in the negative orientation of the Z direction, and is rotated about the movable-plate retaining shaft 131A in the direction indicated by the arrow A1 of FIG. 5, thereby being moved to a position indicated by the dotted line of FIG. 5. A position (positions of the movable plate 131 and the switch 106) of the switching mechanism 111 indicated by the dotted line of FIG. 5 is referred to as the second position P.

The second position P2 of the switch 106 is located on the negative orientation side in the Z direction with respect to the first position P1 of the switch 106. Accordingly, at the second position P2, the operating portion 104C of the locking lever 104 cannot operate (press) the spring piece 106A of the switch 106.

As described above, in the connector 1, the switching mechanism 111 is movable between the first position P1 and the second position P2, and the cover-side protrusion 155 of the cover 121 and the movable-plate-side protrusion 133 of the switching mechanism 111 play a role of retaining the switching mechanism 111 at the first position P1. A force is always applied to the movable plate 131 by the coil spring 145 from the first position P1 to the second position P2 (in the negative orientation of the Z directon).

As illustrated in FIG. 3, the release lever 105 is a rod-like member having a doglegged bent shape, and is arranged on the negative orientation side of the locking lever 104 in the X direction so that the release lever 105 (an image of the release lever 105 projected in the Z direction) partially overlaps the locking lever 104. The release lever 105 is arranged so as to be rotatable in the same directions as those of the locking lever 104, that is in the directions indicated by the arrows A1 and A2 of FIG. 3 about a rotation shaft 105C positioned at a bent portion of the release lever 105.

The rotation shaft 105C is fixed to the inner wall of the large-diameter portion 101C of the outer shell 101 so as to extend in the Y direction of the outer shell 101.

The release lever 105 is arranged in the large-diameter portion 101C of the outer shell 101. An end portion of the release lever 105 close to the locking lever 104 constructs a locking-lever-side end portion 105B to be brought into contact with the operating portion of the locking lever 104.

The locking-lever-side end portion 105B is arranged to be contactable with a lower surface of the operating portion 104C.

An end portion of the release lever 105 distant from the locking lever 104 is exposed to the outside of the large-diameter portion 101C. At the end portion of the release lever 105, there is formed a button-like release button 105A capable of being pressed in a direction indicated by the arrow B1 of FIG. 3, that is, pressed into the outer shell 101.

Specifically, the release button 105A is exposed to the outside from an opening portion 102A formed in the end portion of the large-diameter portion 101C in the negative orientation of the X direction.

A torsion spring 105D is arranged on the rotation shaft 105C. The torsion spring 105D applies a rotational force to the locking lever 104 so as to move the locking-lever-side end portion 105B away from the operating portion 104C (in the direction indicated by the arrow A2 of FIG. 3).

Note that, when the release button 105A is brought into contact with a rim of the opening portion 102A toward the positive orientation of the Z direction, the release button 105A is inhibited from being further moved in the positive orientation of the Z direction. Accordingly, the release button 105A is not further rotated in the direction indicated by the arrow A2 from the state illustrated in FIG. 3

The details of the structure of the connector 1 and the inlet 2 are described above.

Next, actions of the locking lever 104, the switch 106, and the release lever 105 during fitting of the connector unit 200 are described with reference to FIG. 2 and FIG. 7 to FIG. 10.

First, in a state before start of the fitting, that is, when the connector 1 and the inlet 2 are in a completely non-contact state, the locking lever 104, the switch 106, and the release lever 105 are in the state illustrated in FIG. 2.

Specifically, the operating portion 104C of the locking lever 104 presses the spring piece 106A of the switch 108, whereas the locking-lever-side end portion 105B of the release lever 105 does not press the operating portion 104C of the locking lever 104. Even in this state, the battery charger (not shown) detects, by a contact detection circuit not shown), whether or not the contacts 108 of the connector 1 and the contacts 203 of the inlet 2 are in contact with each other. When the contacts are not in contact with each other, charging is not started. Accordingly, an electric leakage is not caused in the state illustrated in FIG. 2.

The locking lever 104 and the release lever 105 are retained at the positions illustrated in FIG. 2 by the flat spring 104B and the torsion spring 105D, respectively.

More specifically, the flat spring 104B applies the rotational force to the locking lever 104 in the direction indicated by the arrow A1, but the locking lever 104 abuts on the opening portion 101D in the state illustrated in FIG. 3. Accordingly, the locking lever 104 is supported at two points, that is, at the rotation shaft 104D and the opening portion 101D, and is retained in this state.

Meanwhile, the torsion spring 105D (see FIG. 3) applies the rotational force to the release lever 105 in the direction indicated by the arrow A2, but the release button 105A abuts on the opening portion 102A (see FIG. 3). Accordingly, the release lever 105 is supported at two points, that is, at the rotation shaft 105C and the opening portion 102A, and is retained in this state.

Next, from the state illustrated in FIG. 2, the small-diameter portion 101B of the outer shell 101 of the connector 1 is inserted into the housing 201 of the inlet 2.

Specifically, while gripping the grip 102 of the connector 1, an operator inserts the small-diameter portion 101B of the outer shell 101 into the housing 201 of the inlet 2 using the distal end 101A as a guide.

Figure 7:
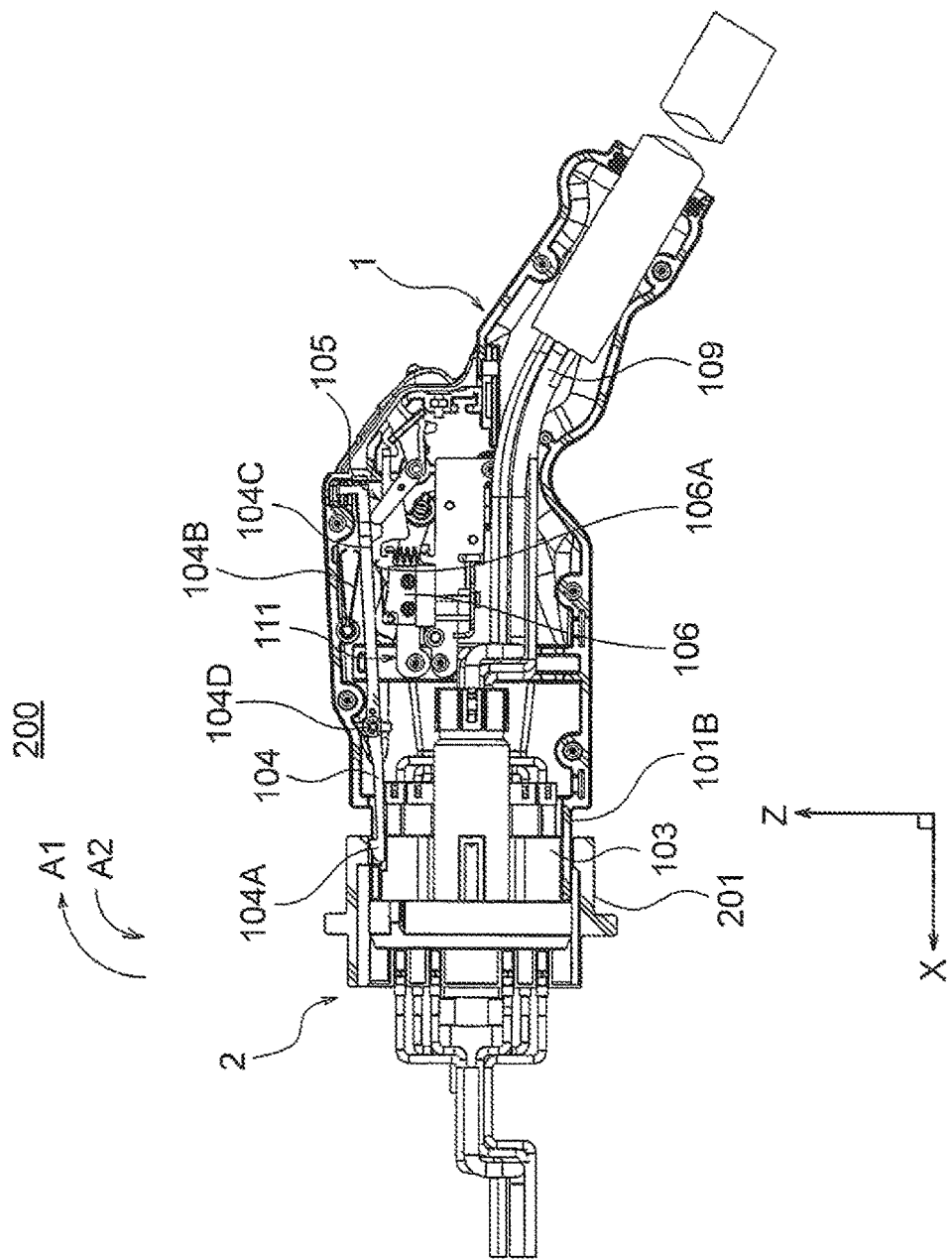
FIG. 7 is a side view (partial sectional view) of the connector unit 200, for illustrating actions of a locking lever 104, the switch 106, and a release lever 105 during fitting of the connector unit 200.

Then, as illustrated in FIG. 7, the locking portion 104A of the locking lever 104 is brought into contact with the inner wall of the housing 201, and is rotated about the rotation shaft 104D in the direction indicated by the arrow A2 against an elastic force of the flat spring 104B, thereby being pushed down in the negative orientation of the Z direction.

This state is a halfway fitting state.

In this state, a most part of the inner housing 103 (small-diameter portion 101B) of the connector 1 is inserted in the housing 201 of the inlet 2. However, the contacts 108 of the connector 1 are only held in contact with the contacts 203 of the inlet 2, and are not locked to and not completely fitted to the contacts 203.

Accordingly, if charging is started in this state, an electric leakage may be caused, thereby exposing an operator to extreme danger, e.g., an electric shock.

However, in this state, the locking portion 104A is pushed down so that the operating portion 104C of the locking lever 104 is moved away from the spring piece 106A of the switch 106 (the operating portion 104C does not press the spring piece 106A).

In this state, the switch 106 generates the signal for interrupting the conduction between the connector 1 and the inlet 2. Alternatively, the switch 106 does not generate the signal capable of establishing the conduction between the connector 1 and the inlet 2.

Accordingly, during halfway fitting, conduction is not established between the connector 1 and the inlet 2, and charging is not started.

Figure 8:
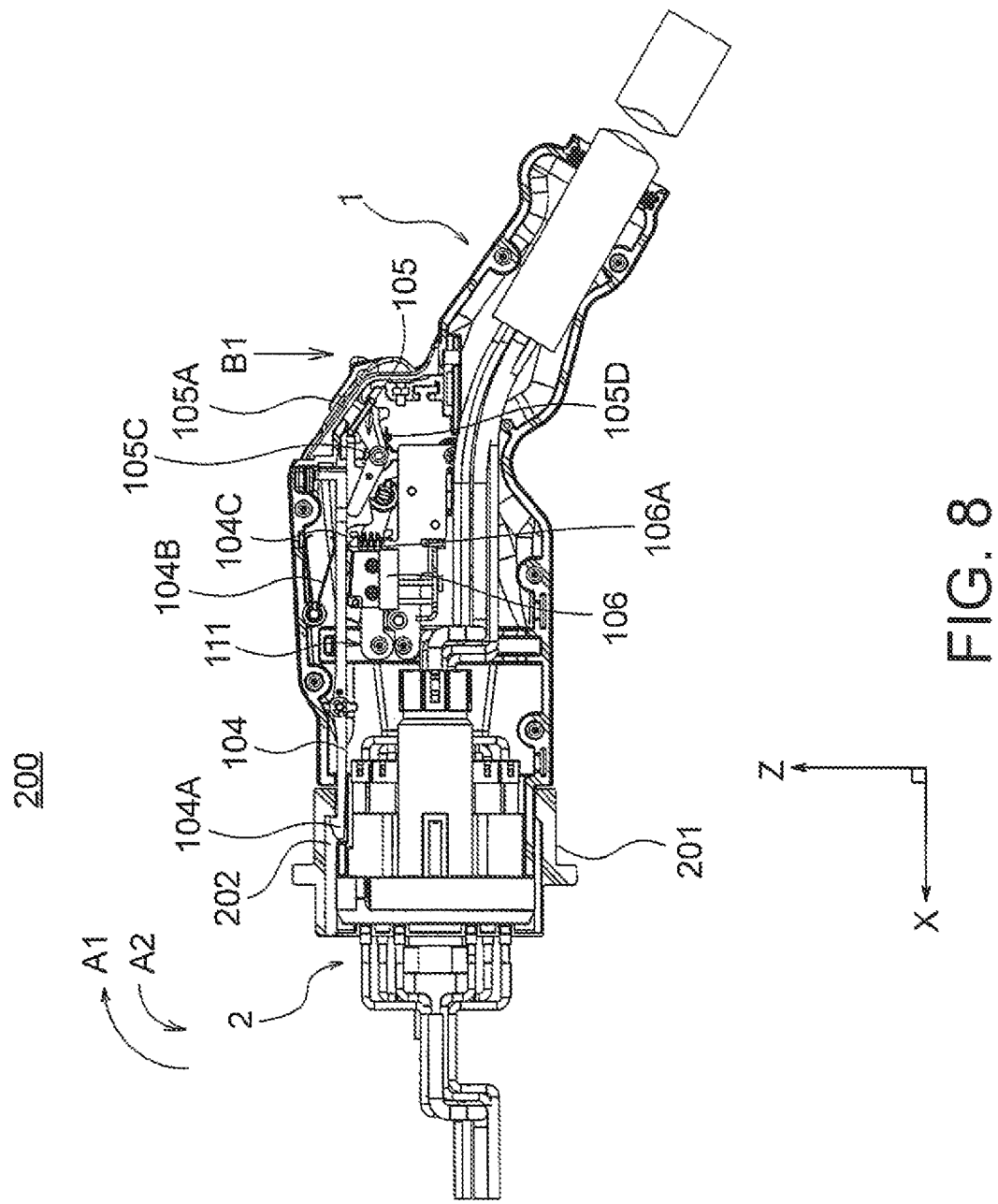
FIG. 8 is a side view (partial sectional view) of the connector unit 200, for illustrating the actions of the locking lever 104, the switch 106, and the release lever 105 during the fitting of the connector unit 200.

Next, when the connector 1 is further inserted from the state illustrated in FIG. 7 and then the locking portion 104A reaches the inlet-side locking portion 202 past the inner wall of the housing 201, as illustrated in FIG. 8, the locking lever 104 is rotated by the elastic force of the flat spring 104B in the direction indicated by the arrow A1 so that the locking portion 104A is brought into contact with the inlet-side locking portion 202.

In this state, the operating portion 104C presses the spring piece 106A again. Thus, the switch 106 generates the signal capable of establishing the conduction between the connector 1 and the inlet 2.

That is, charging is possible. Thus, charging is performed in such a manner that an electric current flows from the connector 1 to the inlet 2 through a cable 9.

In this state, as described above, the locking portion 104A is held in contact with the inlet-side locking portion 202. Accordingly, the inlet 2 and the connector 1 are locked to each other, and have no risk of unexpected disengagement.

When charging is finished, an operator presses the release button 105A of the release lever 105 in the direction indicated by the arrow B1 of FIG. 8.

Figure 9:
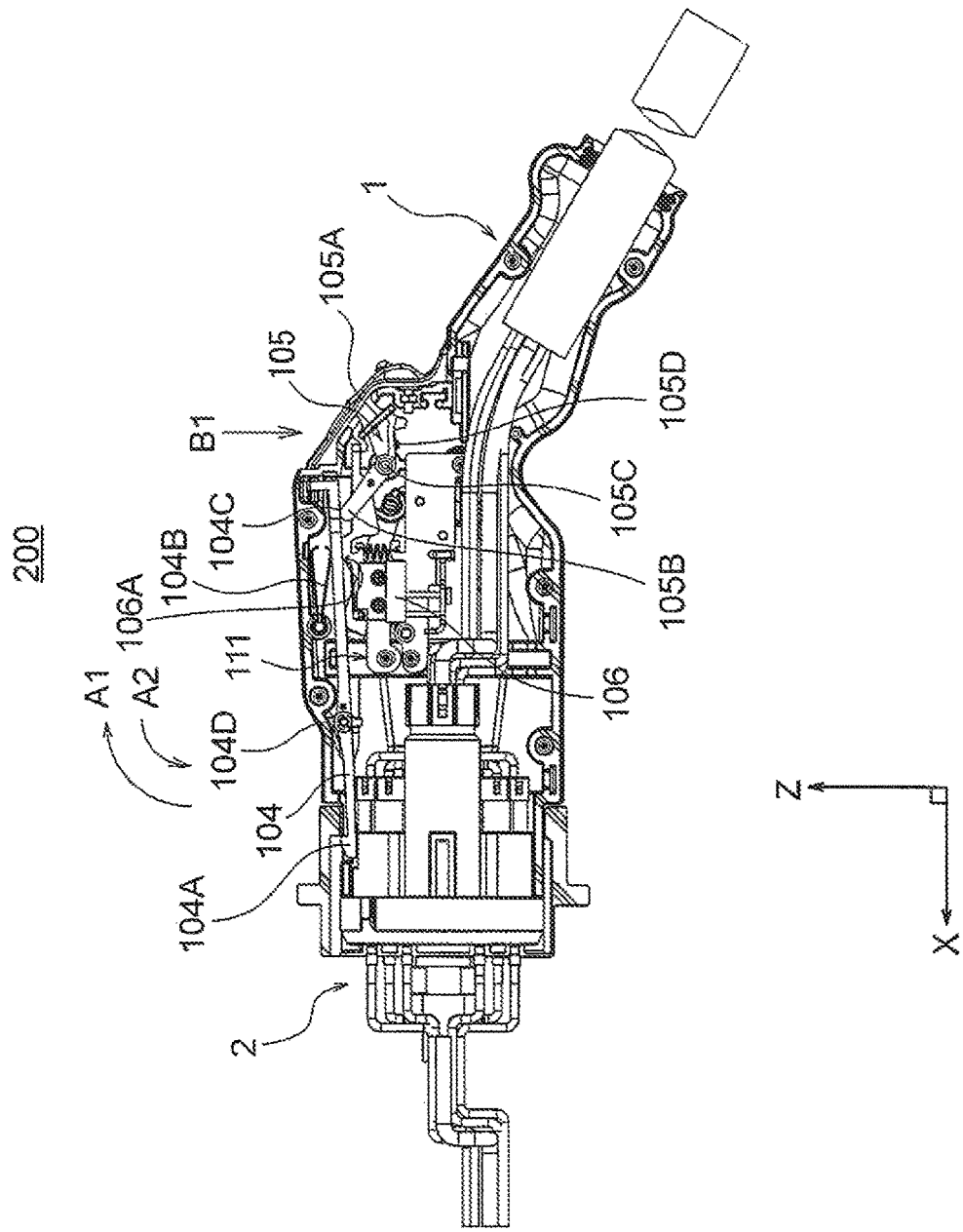
FIG. 9 is a side view (partial sectional view) of the connector unit 200, for illustrating the actions of the locking lever 104, the switch 106, and the release lever 105 during the fitting of the connector unit 200.

Then, as illustrated in FIG. 9, the release lever 105 is rotated about the rotation shaft 105C against the elastic force of the torsion spring 105D in the direction indicated by the arrow A1. Consequently, the locking-lever-side end portion 105B is brought into contact with the operating portion 104C, thereby pressing the operating portion 104C in the positive orientation of the Z direction.

When the operating portion 104C is pressed in the positive orientation of the Z direction, the locking lever 104 is rotated about the rotation shaft 104D against the elastic force of the flat spring 104B in the direction indicated by the arrow A2. Consequently, the locking portion 104A is pushed down in the negative orientation of the Z direction.

Meanwhile, the operating portion 104C of the locking lever 104 is pushed up in the positive orientation of the Z direction, and is moved away from the spring piece 106A of the switch 106. Accordingly, the switch 106 generates the signal for interrupting the conduction between the connector 1 and the inlet 2. Alternatively, the switch 106 does not generate the signal capable of establishing the conduction between the connector 1 and the inlet 2.

The locking portion 104A pushed down in the negative orientation of the Z direction is moved away from the inlet-side locking portion 202. Consequently, the contact between the locking portion 104A and the inlet-side locking portion 202 is cancelled.

Figure 10:
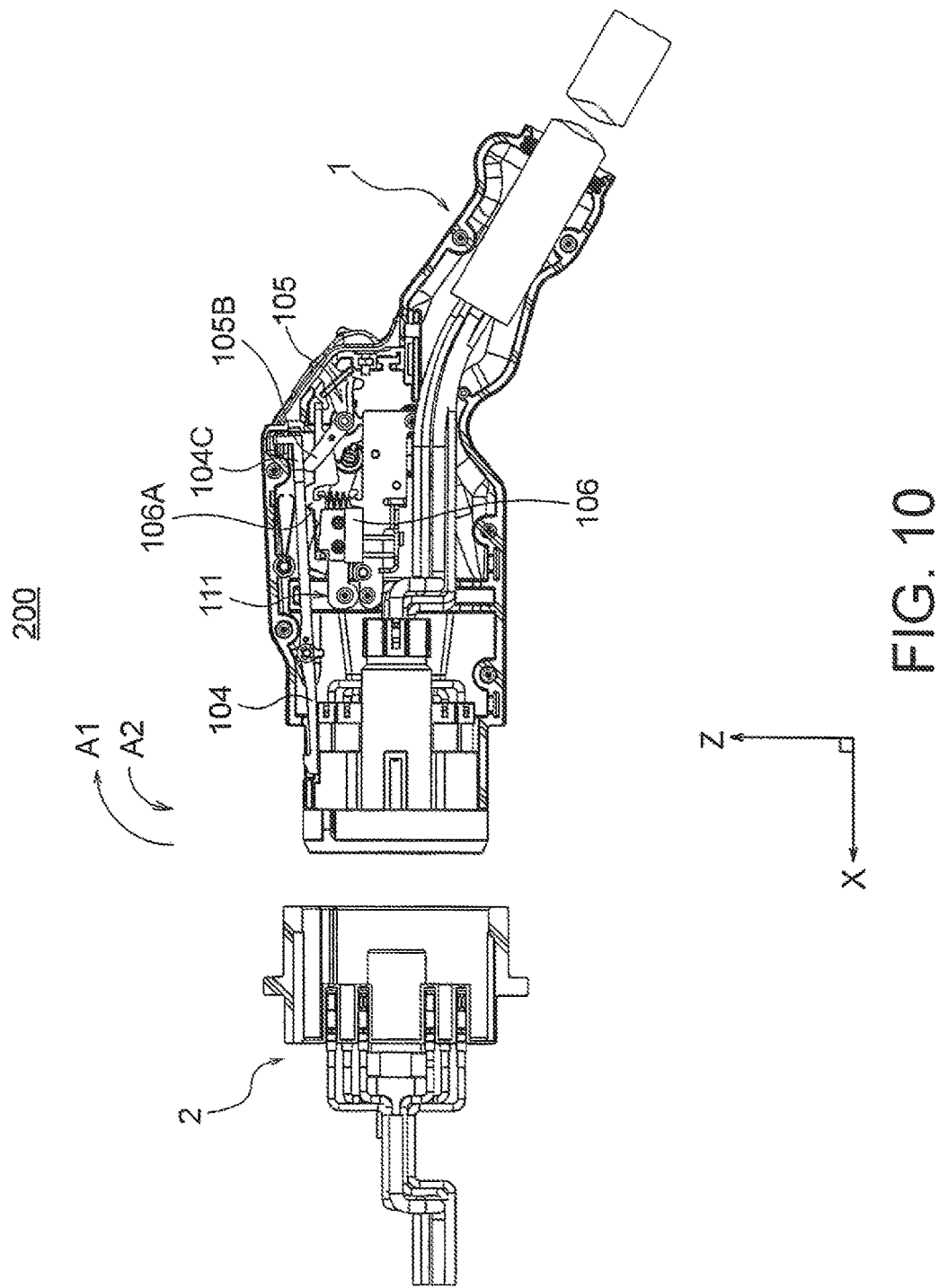
FIG. 10 is a side view (partial sectional view) of the connector unit 200, for illustrating the actions of the locking lever 104, the switch 106, and the release lever 105 during the fitting of the connector unit 200.

In this state, the connector 1 and the inlet 2 do not establish conduction therebetween, and are not locked to each other. Accordingly, as illustrated in FIG. 10, the connector 1 can be pulled out of the inlet 2 without a risk of an electric leakage.

When the connector 1 is pulled out of the inlet 2 and then the pressing of the release lever 105 is released, the locking lever 104 is rotated by the elastic force of the flat spring 104B in the direction indicated by the arrow A1, and the release lever 105 is rotated by the elastic force of the torsion spring 105D in the direction indicated by the arrow A2. Thus, the connector 1 is returned to the state illustrated in FIG. 2 prior to the fitting.

The actions of the locking lever 104, the switch 106, and the release lever 105 during the fitting of the connector unit 200 are described above.

Next, with reference to FIG. 5, FIG. 8, FIG. 11, and FIG. 12, description is made of a procedure of forcibly releasing locking when the locking lever 104 cannot be moved due to breakage of the release lever 105, intrusion of a foreign matter, or the like, and a procedure of urgently disengaging the connector 1 from the inlet 2 under a state in which the connector 1 and the inlet 2 are fitted to each other.

First, description is made of a case where the locking lever 104 cannot be moved in the state illustrated in FIG. 8.

Figure 11:
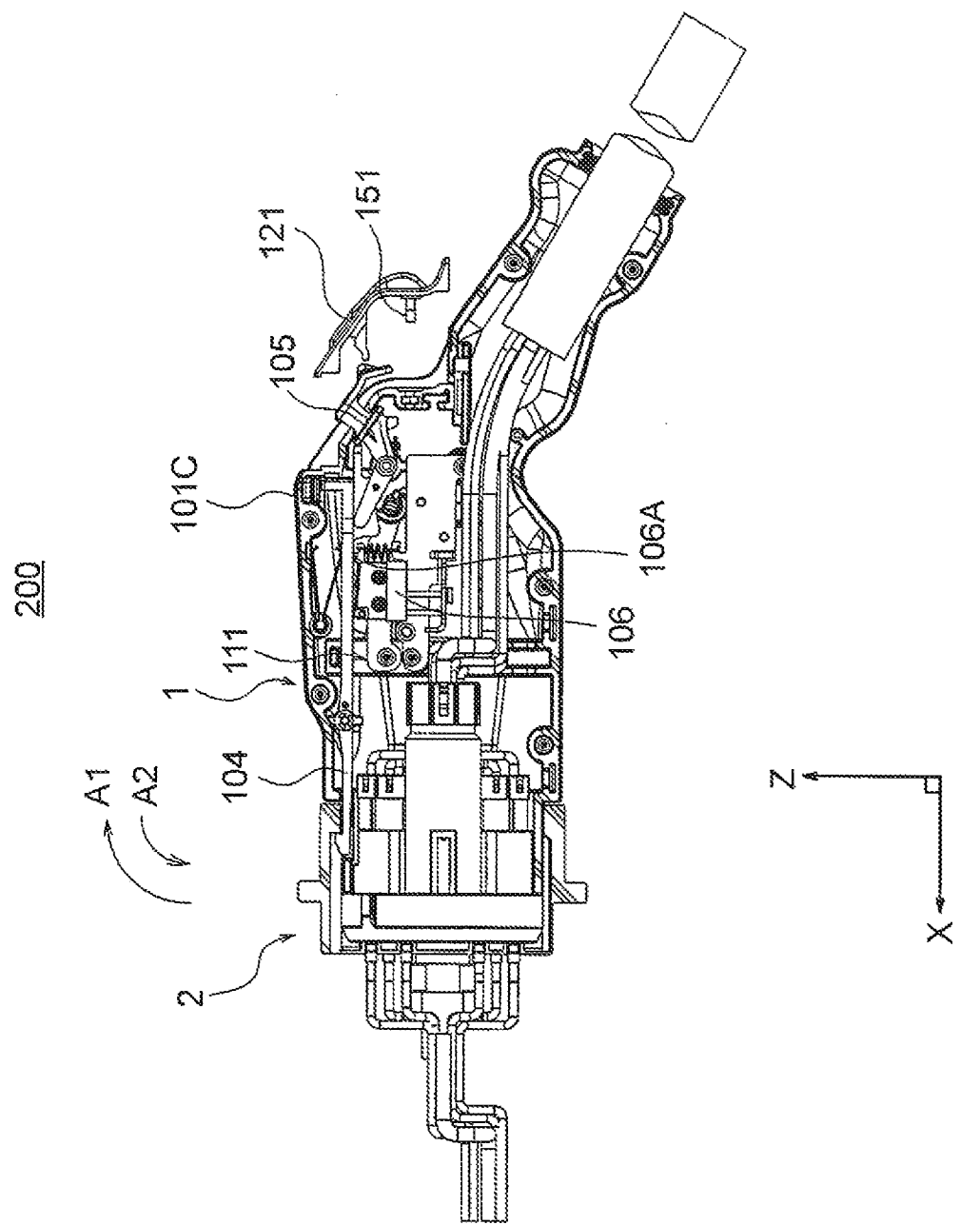
FIG. 11 is a side view (partial sectional view) of the connector unit 200, for illustrating a procedure for forcibly releasing.

In this case, first, as illustrated in FIG. 11, an operator removes the cover fixing screw 151 from the large-diameter portion 101C, and then dismounts the cover 121 from the large-diameter portion 101C.

Then, as illustrated in FIG. 5, the cover-side protrusion 155 of the cover 121 is disengaged from the movable-plate-side protrusion 133 of the movable plate 131.

In this manner, as illustrated in FIG. 5, the movable plate 131 is pulled by the coil spring 145 in the negative orientation of the Z direction, and is rotated about the movable-plate retaining shaft 131A in the direction indicated by the arrow A1 of FIG. 5. Consequently, the switching mechanism 111 is moved to the second position P2. Thus, the switch 106 is shifted to a position at which the locking lever 104 is incapable of operating the switch 106 (the operating portion 104C is moved away from the spring piece 106A). Accordingly, the switch 106 generates the signal for interrupting the conduction between the connector 1 and the inlet 2. Alternatively, the switch 106 does not generate the signal capable of establishing the conduction between the connector 1 and the inlet 2.

Accordingly, in this state, the connector 1 and the inlet 2 do not establish conduction therebetween.

The cover 121 is dismounted from the large-diameter portion 101C so that the forcibly releasing jig insertion hole 113 is exposed to the outside of the connector 1. Accordingly, an operator can visually recognize the locking lever 104 through the forcibly releasing jig insertion hole 113 (see FIG. 6).

Figure 12:
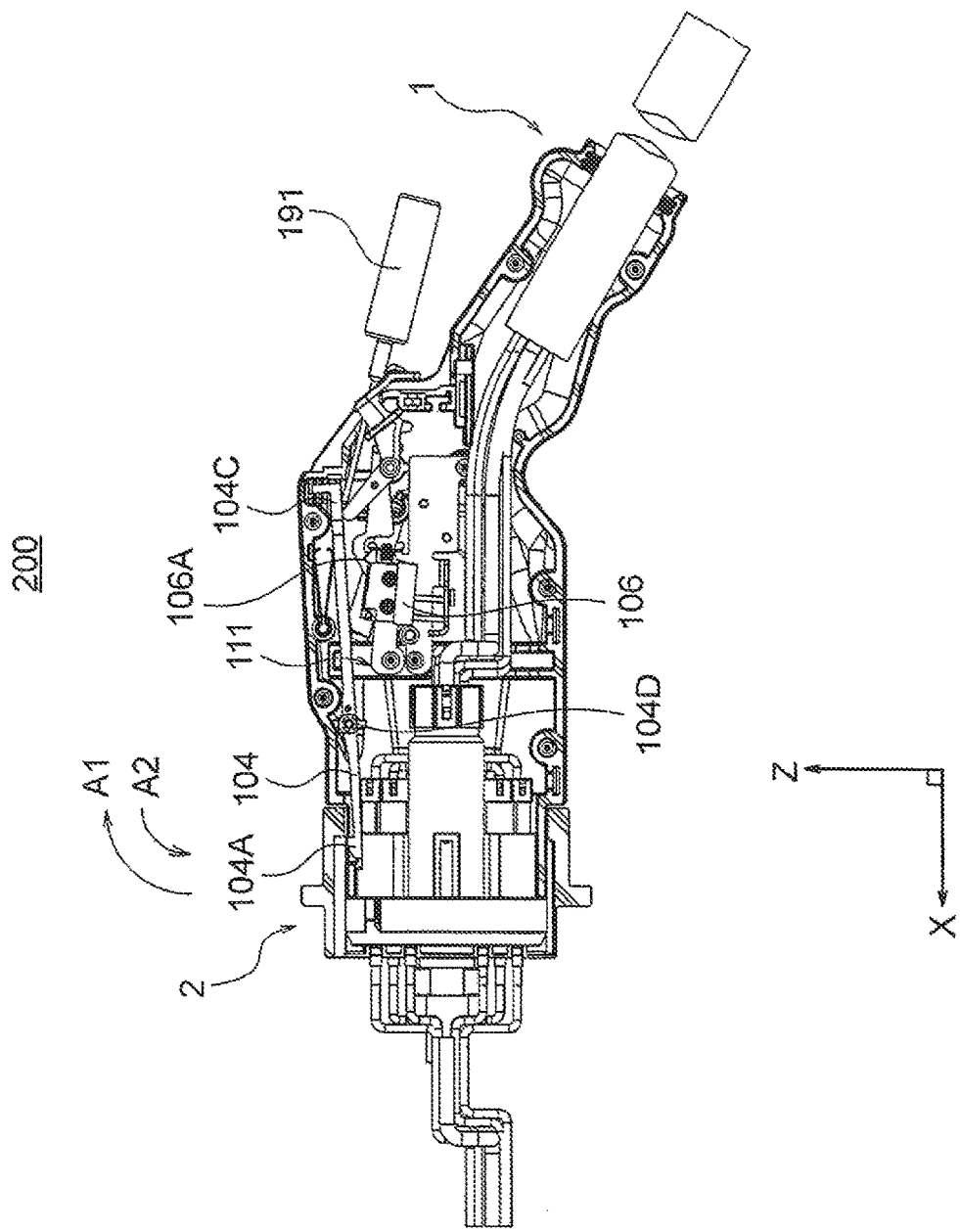
FIG. 12 is a side view (partial sectional view) of the connector unit 200, for illustrating the procedure for forcibly releasing.

Next, as illustrated in FIG. 12, an operator insert, a forcibly releasing jig 191 e.g., a screwdriver into the large-diameter portion 101C through the forcibly releasing jig insertion hole 113 (see FIG. 6), and then rotates the locking lever 104 in the direction indicated by the arrow A2 by, for example, forcibly pushing up the operating portion 104C of the locking lever 104 in the positive orientation of the Z direction. In this manner, the locking portion 104A is disengaged from the inlet-side locking portion 202, thereby forcibly releasing locking.

Next, in this state, the connector 1 is pulled out of (urgently disengaged from) the inlet 2. An operator makes an investigation on the pulled-out connector 1 as needed to determine a reason why the locking lever 104 cannot be moved, and cears the reason. Thus, the locking lever 104 is returned to a movable condition again.

Figure 13:
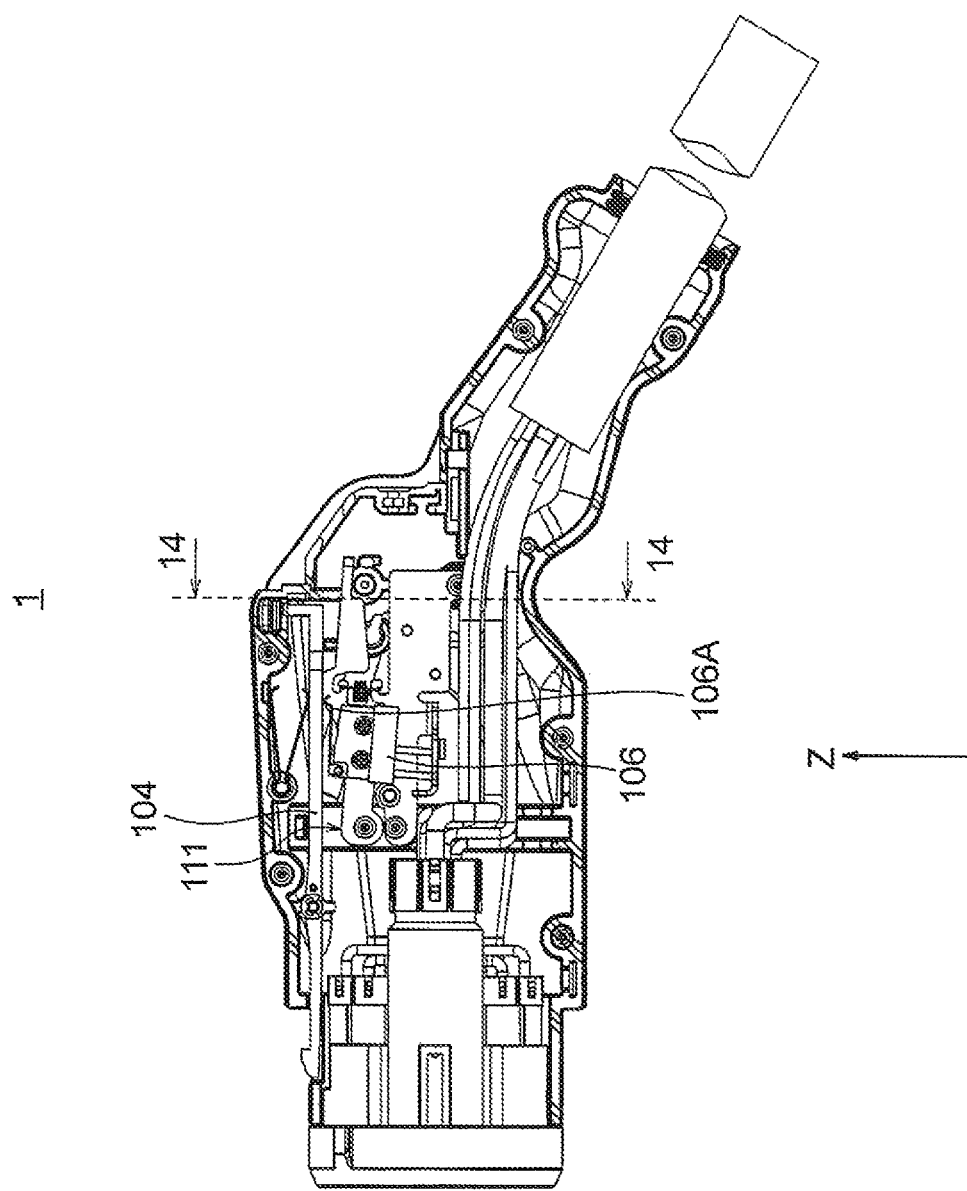
FIG. 13 is a side view (partial sectional view) of the connector 1, for illustrating the procedure for forcibly releasing.

Thus, the connector 1 is brought into the state illustrated in FIG. 13, and the forcibly releasing and the urgent disengagement are completed.

As illustrated in FIG. 14, regarding the end portion of the locking lever 104 on the operating portion 104C side, when a surface of the end portion in the negative orientation of the Z direction is brought into contact with the locking-lever stopper 161 that is formed so as to protrude from the large-diameter portion 101C in the positive orientation of the Y direction, the locking lever 104 is inhibited from being further rotated in the direction indicated by the arrow A1. Accordingly, even when, for example, the rotation shaft 104D is dismounted during forcibly releasing so that the locking lever 104 is not retained on the large-diameter portion 101C, the locking lever 104 does not fall down in the negative orientation of the Z direction, and does not operate the switch 106 by mistake.

The connector 1 is required to expose the forcibly releasing jig insertion hole 113 to the outside in order to forcibly release locking. Accordingly, it is necessary to dismount the cover 121 from the large-diameter portion 101C. When the cover 121 is dismounted from the large-diameter portion 101C, the switching mechanism 111 is moved to the second position P2. Consequently, a pressing state of the spring piece 106A is released, thereby interrupting the conduction between the connector 1 and the inlet 2.

Accordingly, during the forcibly releasing, the conduction between the connector 1 and the inlet 2 is always interrupted. Thus, there are no risks of an electric leakage and an electric shock to an operator during the forcibly releasing.

Therefore, the connector 1 can be forcibly released more safely than in the related art.

The cover 121 is arranged at the rear end of the large-diameter portion 101C. That is, the cover 121 is arranged at the end portion opposite to the distal end 101A in a fitting direction X.

Accordingly, the cover 121 can be dismounted without interference with the peripheral structure of the inlet 2.

Specifically, the inlet 2 is a connector mounted on, for example, an automobile side. Accordingly, depending on the structure of the automobile, the inlet 2 may be arranged in a depth (inside) of an exterior of the automobile. Under a state in which the inlet 2 and the connector 1 are fitted to each other, a most part of the connector 1 on the distal end 101A side may be invisible from the outside.

Even in this case, when the cover 121 is mounted to the rear end of the large-diameter portion 101C, the cover 121 is easily dismounted.

The procedures for the forcibly releasing and the urgent disengagement are described above.

Next, with reference to FIG. 13 to FIG. 21, description is made of a procedure of returning, to a usable state, the connector 1 including the locking lever 104 that is returned to the movable condition again after the urgent disengagement.

As described above, during the forcibly releasing, the switching mechanism 111 is moved to the second position P2, and the locking lever 104 is shifted to the position at which the locking lever 104 is incapable of operating the switch 106. Accordingly, in this state, the switch 106 generates the signal for interrupting the conduction between the connector 1 and the inlet 2, or does not generate the signal capable of establishing conduction therebetween. Therefore, only returning the locking lever 104 to the movable condition again is insufficient to return the connector 1 after the urgent disengagement to the usable state. There is also needed a procedure of retaining the switching mechanism 111 at the first position P1 after returning the switching mechanism 111 to the first position P1. In the following, the above-mentioned procedure is referred to as a returning procedure, and the returning procedure is specifically described below.

Figure 15:
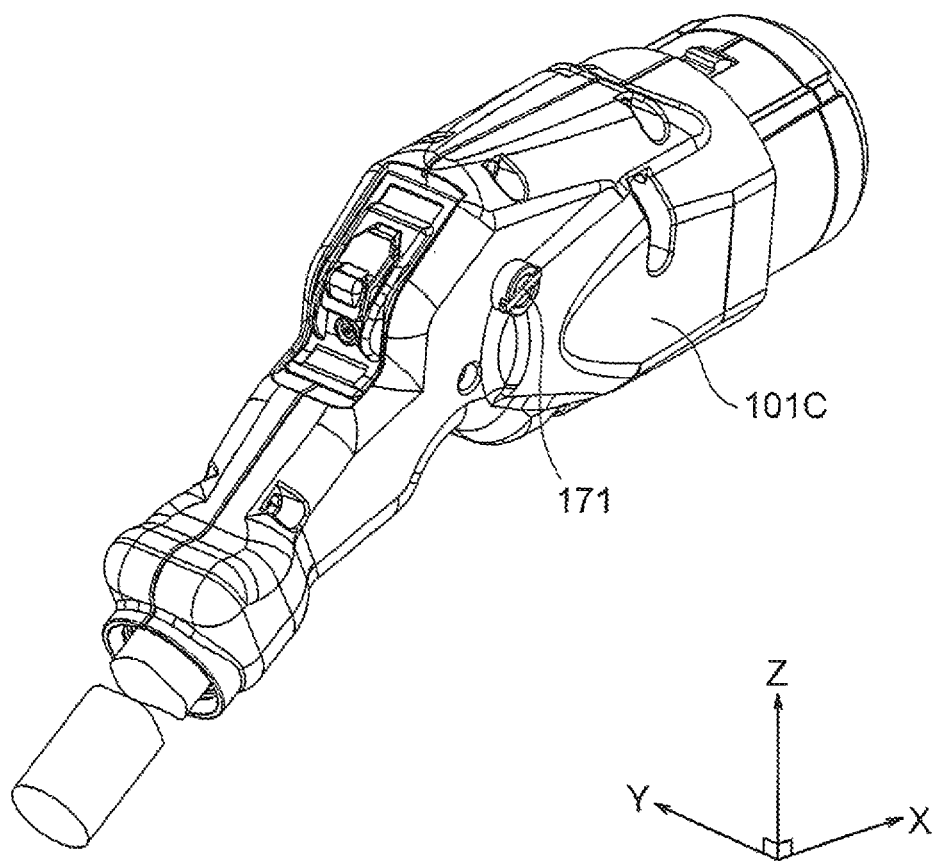
FIG. 15 is a perspective view of the connector 1, for illustrating a procedure of returning, to a usable state, the connector 1 including the locking lever 104 that is returned to a movable condition again.

First, in the state illustrated in FIG. 13 and FIG. 14, an operator dismounts a cap 171 mounted on a side surface of the large-diameter portion 101C in the negative orientation of the Y direction illustrated in FIG. 15.

Figure 16:
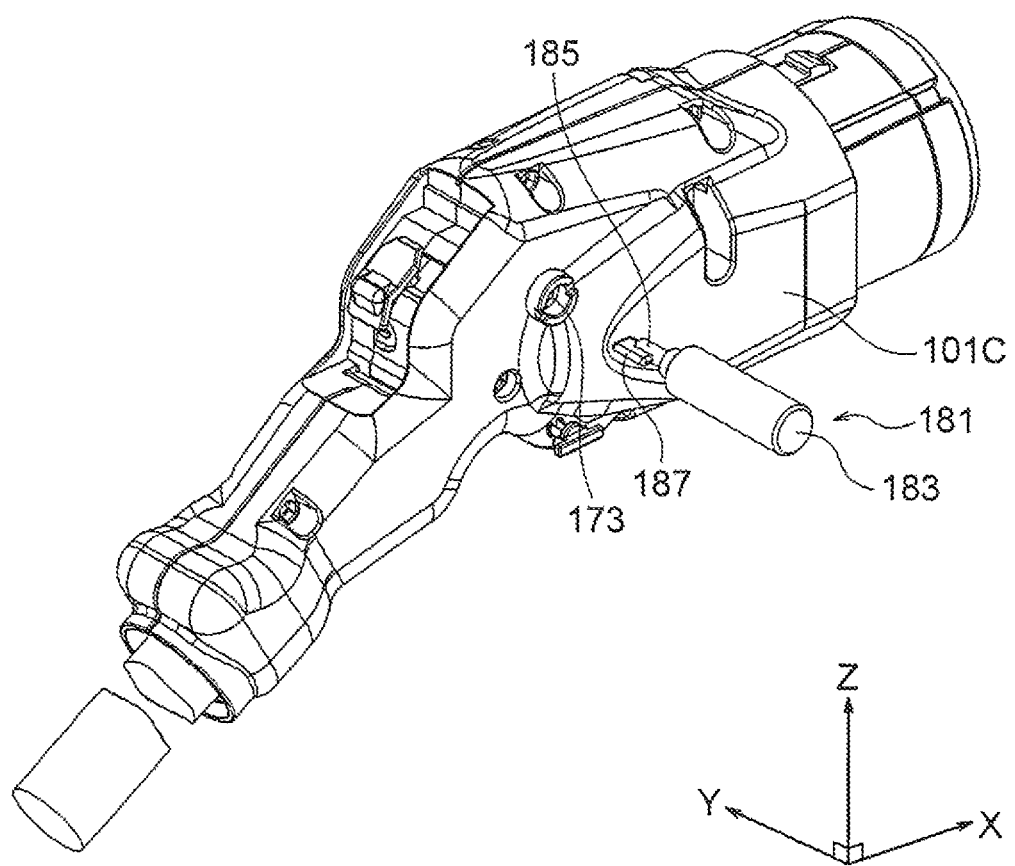
FIG. 16 is a perspective view of the connector 1, for illustrating the procedure of returning, to the usable state, the connector 1 including the locking lever 104 that is returned to the movable condition again.
Figure 17:
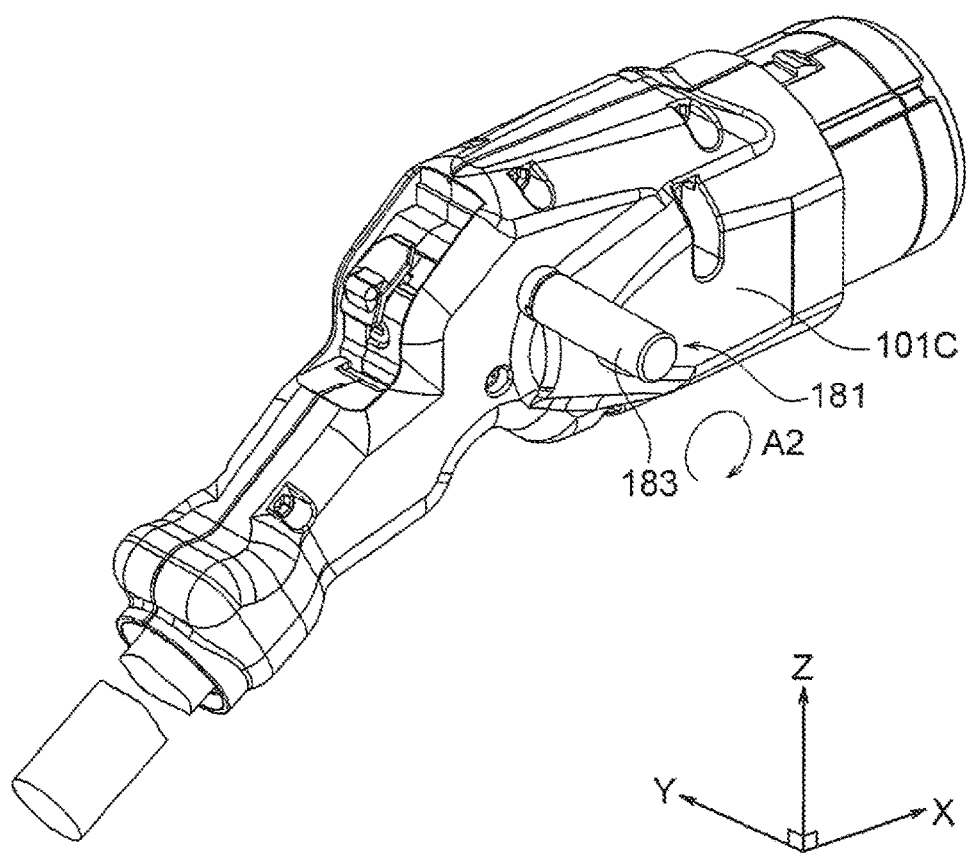
FIG. 17 is a perspective view of the connector 1, for illustrating the procedure of returning, to the usable state, the connector 1 including the locking lever 104 that is returned to the movable condition again.
Figure 18:
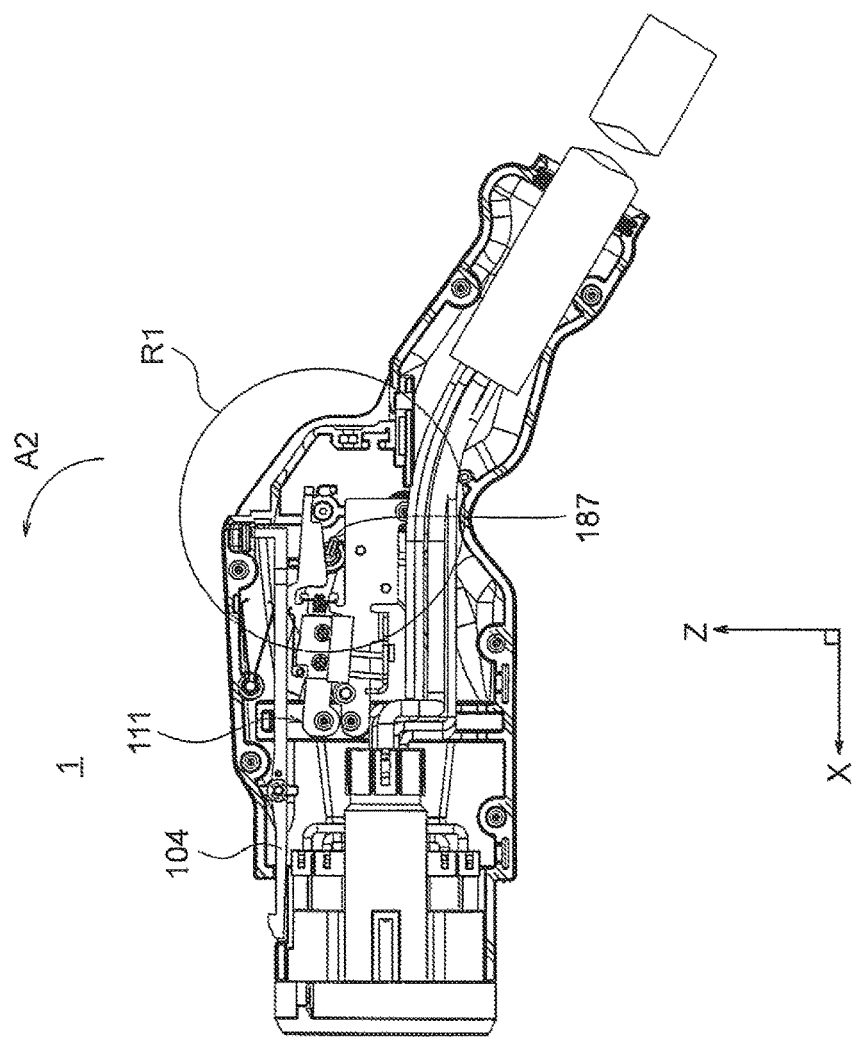
FIG. 18 is a side view (partial sectional view) of the connector 1 corresponding to the state illustrated in FIG. 17, for illustrating the procedure of returning, to the usable state, the connector 1 including the locking lever 104 that is returned to the movable condition again.

The cap 171 is a member configured to close a returning hole 173 illustrated in FIG. 16. Accordingly, when the cap 171 is dismounted, the returning hole 173 is exposed.

The returning hole 173 is formed at a position at which the guide portion 139 of the movable plate 131 is visually recognizable from the outside. Accordingly, when the returning hole 173 is exposed, an operator can visually recognize the guide portion 139 from the outside.

Next, an operator prepares a returning jig 181 illustrated in FIG. 16.

As illustrated in FIG. 16, the returning jig 181 includes a grip 183 having a round bar-like shape, an insertion portion 185 formed at a distal end of the grip 183 and having a round bar-like shape (shaft shape) and a diameter smaller than that of the grip 183, and a plate-like key portion 187, which is formed at a distal end portion of the insertion portion 185 so as to protrude in a radial direction of the insertion portion 185, and is configured to be brought into contact with the guide portion 139.

Figure 19:
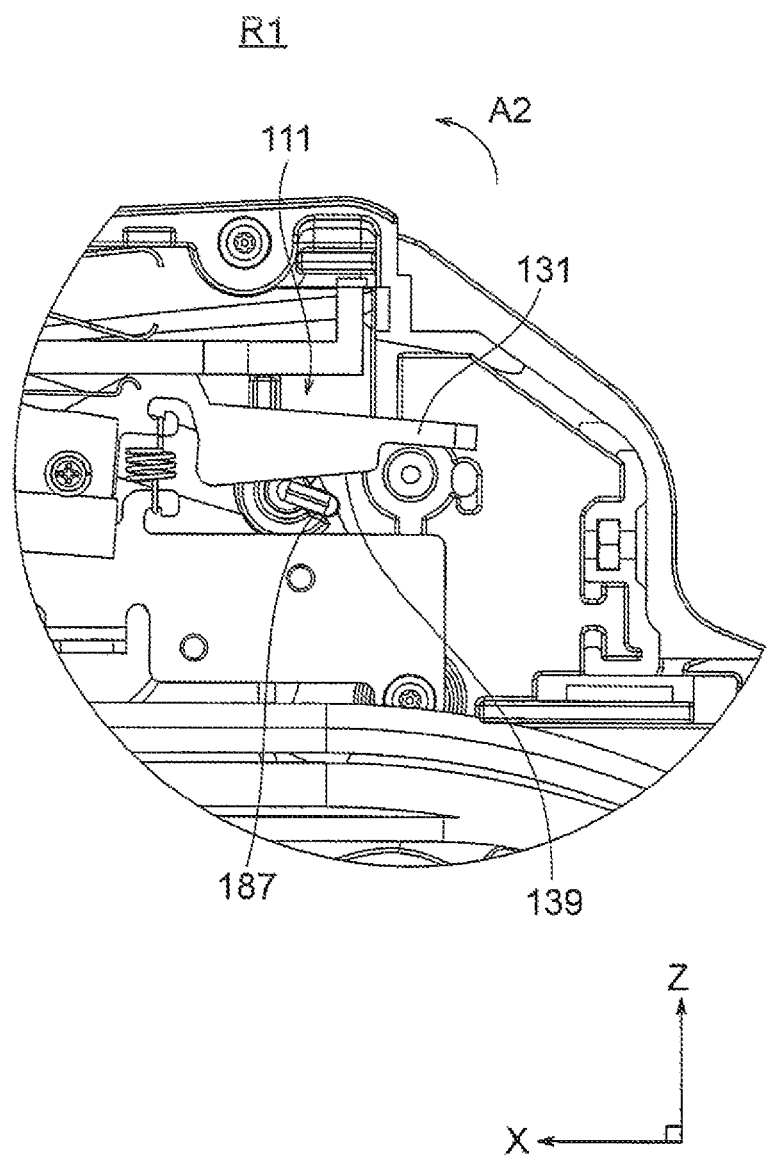
FIG. 19 is an enlarged view of a region R1 illustrated in FIG. 18.

Next, as illustrated in FIG, 17 to FIG. 19, an operator inserts the insertion portion 185 of the returning jig 181 into the large-diameter portion 101C from the returning hole 173. In addition, as illustrated in FIG. 20 and FIG. 21, an operator rotates the grip 183 in the direction indicated by the arrow A2, thereby bringing the key portion 187 into contact with the guide portion 139 of the movable plate 131.

Figure 20:
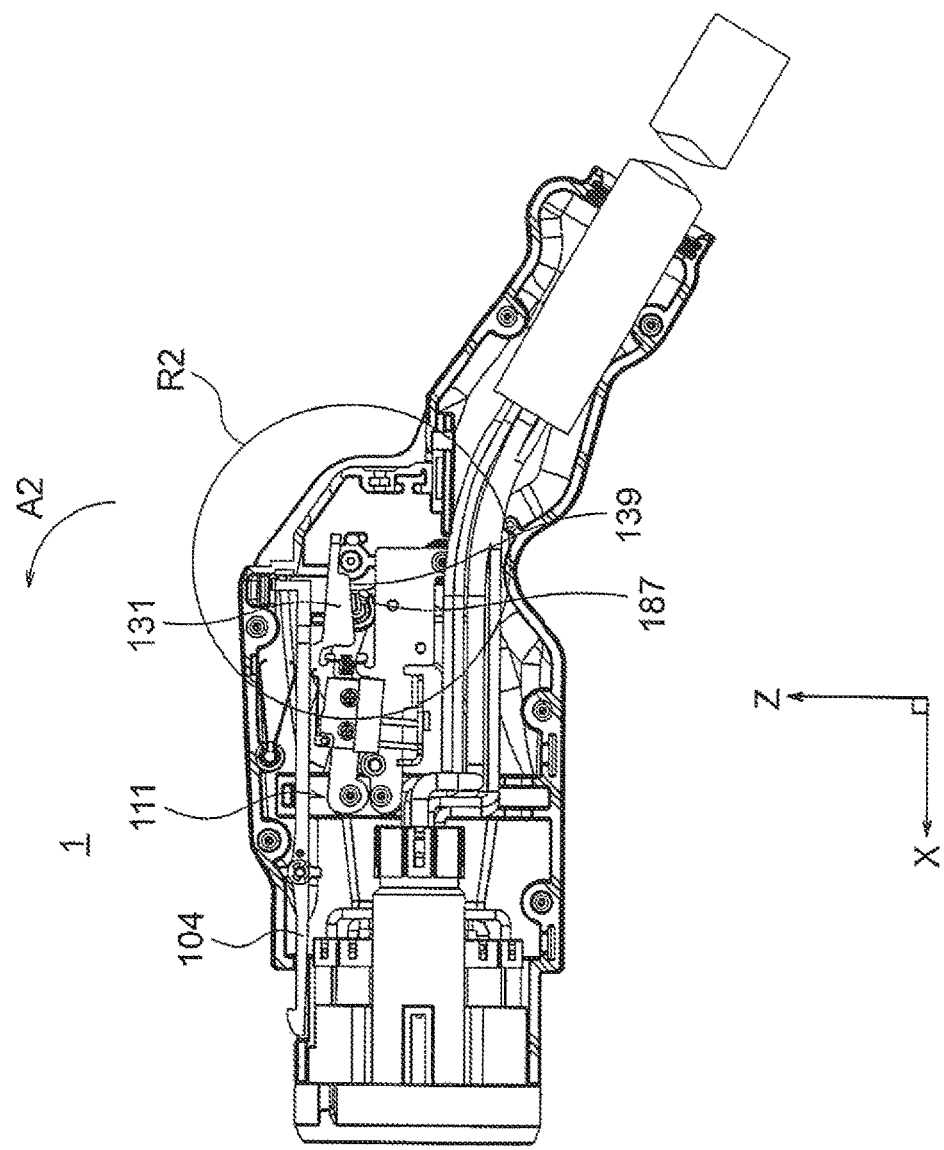
FIG. 20 is a side view (partial sectional view) of the connector 1, for illustrating the procedure of returning, to the usable state, the connector 1 including the locking lever 104 that is returned to the movable condition again.
Figure 21:
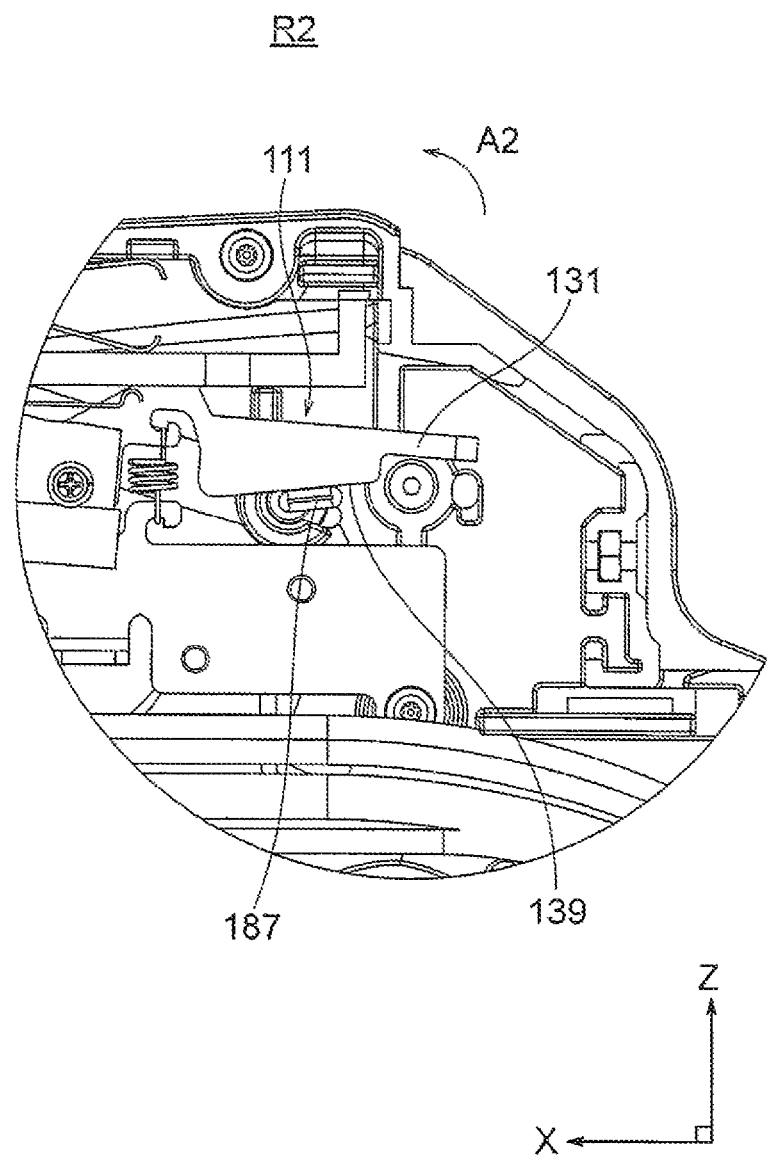
FIG. 21 is an enlarged view of a region R2 illustrated in FIG. 20.

Next, an operator rotates the grip 183 in the direction indicated by the arrow A2 of FIG. 20 and FIG. 21. Then, while being rotated in the direction indicated by the arrow A2, the key portion 187 pushes up the movable plate 131 (switching mechanism 111) in the positive orientation of the Z direction using the guide portion 139 of the movable plate 131 as a guide.

Figure 22:
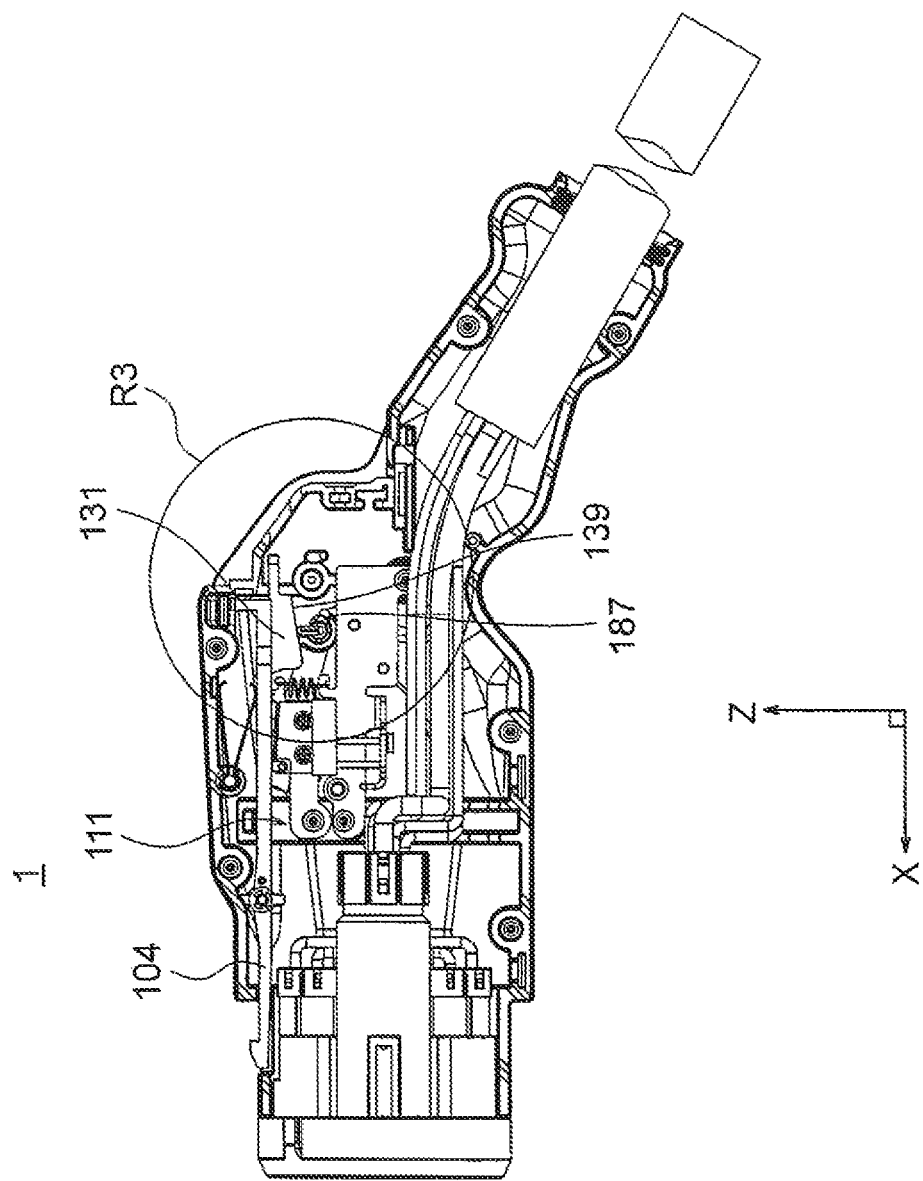
FIG. 22 is a side view (partial sectional view) of the connector 1, for illustrating the procedure of returning, to the usable state, the connector 1 including the locking lever 104 that is returned to the movable condition again.
Figure 23:
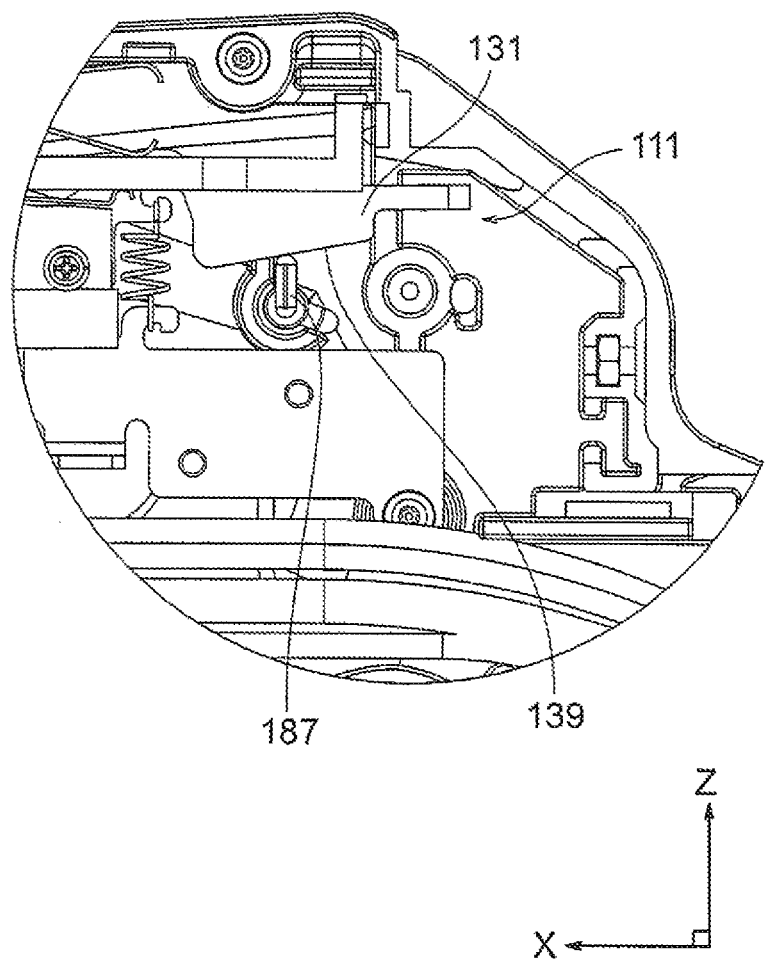
FIG. 23 is an enlarged view of a region R3 illustrated in FIG. 22.
Figure 24:
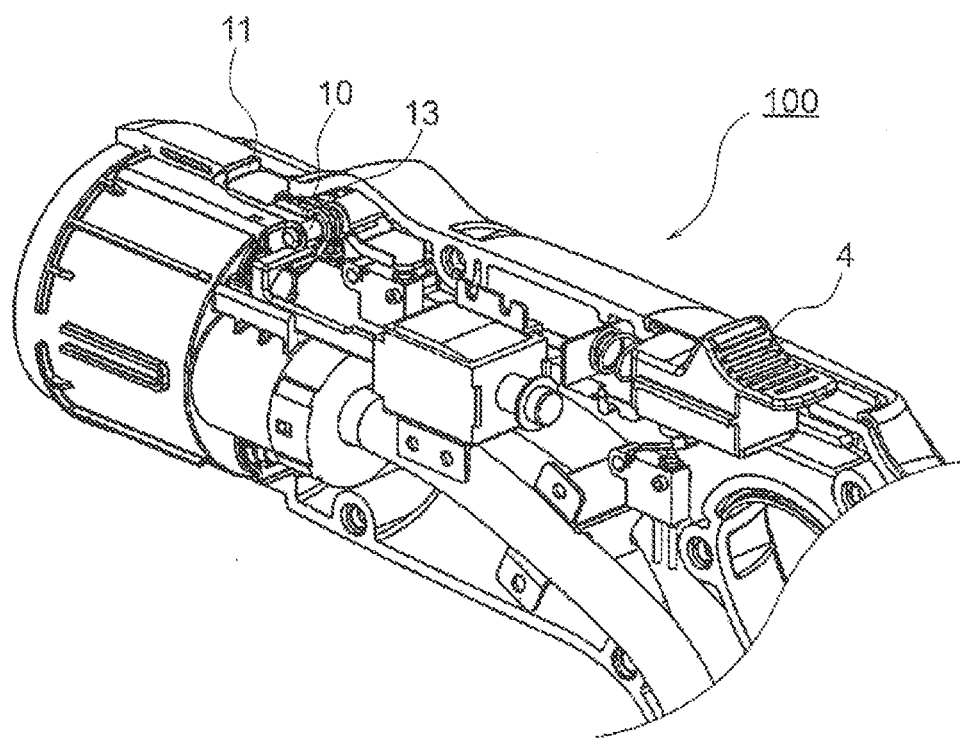
FIG. 24 is a perspective view of a related-art vehicle charging connector 100.

As illustrated in FIG. 22 and FIG. 23, when the switching mechanism 111 is pushed up to the first position P1 (see FIG. 5), an operator stops rotating the grip 183, and mounts the cover 121 to the large-diameter portion 101C again.

In this manner, as illustrated in FIG. 4 and the like, the cover-side protrusion 155 of the cover 121 is brought into contact with the movable-plate-side protrusion 133 of the movable plate 131 again. Thus, the switching mechanism 111 is retained at the first position P1 illustrated in FIG. 5.

In this state, the locking lever 104 can operate the switch 106 again. Thus, the switch 106 can generate the signal capable of establishing the conduction between the connector 1 and the inlet 2, and the connector 1 is available again.

Next an operator pulls the insertion portion 185 of the returning, jig 181 out of the returning hole 173, and, then closes the returning hole 173 by the cap 171.

Finally, an operator fixes the cover 121 to the large-diameter portion 101C with the cover fixing screw 151.

The procedure of returning, to the usable state, the connector 1 including the locking lever 104 that is returned to the movable condition again is described above.

As described above, according to this embodiment, the connector 1 includes the locking lever 104, the switching mechanism 111, the outer shell 101, and the cover 121. The locking lever 104 is rotatable, and is configured to lock the fitting state between the inlet 2 and the connector 1. The switching mechanism 111 is arranged so as to be movable between the first position P1 and the second position P2, and includes the switch 106. The switch 106 generates the signal capable of establishing the conduction between the connector 1 and the inlet 2 when operated by the locking lever 104. The switch 106 generates the signal for interrupting the conduction between the connector 1 and the inlet 2, or does not generate the signal capable of establishing the conduction between the connector 1 and the inlet 2 under a state in which the switch 106 is not operated by the locking lever 104. The outer shell 101 is configured to accommodate the locking lever 104 and the switching mechanism 111 therein. The cover 121 is arranged on the outer shell 101 so that at least the part of the cover 121 is exposed to the outside of the outer shell 101, and the cover 121 includes the cover-side protrusion 155. The switching mechanism 111 includes the movable-plate-side protrusion 133 configured to retain the switching mechanism 111 at the first position P1 through contact with the cover-side protrusion 155. The locking lever 104 includes the rotation shaft 104D defining the center of rotation, the locking portion 104A to be brought into contact with the inlet 2, and the operating portion 104C that is arranged on the opposite side of the locking portion 104A across the rotation shaft 104D, and is capable of operating the switch 106. When the switching mechanism 111 is located at the first position P1, the locking lever 104 is rotated so that the operating portion 104C is capable of operating the switch 106. When the cover-side protrusion 155 and the movable-plate-side protrusion 133 are in a non-contact state, the switching mechanism 111 is arranged at the second position P2. When the switching mechanism 111 is located at the second position P2, the operating portion 104C is incapable of operating the switch 106.

Therefore, the connector 1 can be forcibly released more safely than in the related art.

This invention is described above with reference to the embodiment but this invention is not limited to the above-mentioned embodiment.

It goes without saying that a person skilled in the art can conceive a variety of modifications and improvements within the technical scope of this invention, and the modifications and the improvements may be understood as being encompassed within the scope of this invention.

For example, in the above-mentioned embodiment, as the switching mechanism 111, there is exemplified the structure in which the cover 121 and the switch 106 are brought into contact with each other through the movable plate 131. However, the switching mechanism 111 may have the structure including no movable plate 131 and bringing the switch 106 and the cover 121 into direct contact with each other.

In the above-mentioned embodiment, the cover 121 is arranged outside the outer shell 101, but it is only necessary that at least a part of the cover 121 be exposed to the outside of the outer shell 101. Accordingly, for example, the cover 121 may be structured like an operable window so that a part of the cover 121 is exposed to the outside of the outer shell, whereas the other part thereof is arranged inside the outer shell 101.

In the above-mentioned embodiment, description is made of the structure capable of disengaging the cover 121 from the switching mechanism 111. However, as long as the switching mechanism 111 is retained at the first position P1 when the cover-side protrusion 155 and the movable-plate-side protrusion 133 are in a contact state, and as long as the switching mechanism 111 is retained at the second position P2 when the cover-side protrusion 155 and the movable-plate-side protrusion 133 are in a non-contact state, there may be adopted the structure in which the switching mechanism 111 and the cover 121 are always held in contact with each other and the cover 121 is not disengaged from the switching mechanism 111.

What is claimed is:

1. An electrical connector, comprising:
    a locking lever, which is rotatable and configured to lock a fitting state between the electrical connector and a mating connector;
    a switching mechanism, which is arranged so as to be movable between a first position and a second position, the switching mechanism comprising a switch that generates a signal capable of establishing conduction between the electrical connector and the mating connector when operated by the locking lever, and the switch generates a signal for interrupting the conduction between the electrical connector and the mating connector, or does not generate the signal capable of establishing the conduction between the electrical connector and the mating connector under a state in which the switch is not operated by the locking lever;
    a shell, which is configured to accommodate the locking lever and the switching mechanism therein;
    a cover comprising a cover-side retaining portion, the cover being arranged on the shell so that at least a part of the cover is exposed to an outside of the shell; and
    a switch-side retaining portion, which is arranged in the switching mechanism and configured to retain the switching mechanism at the first position through contact with the cover-side retaining portion, the locking lever comprising:
        a rotation shaft defining a center of rotation;
        a locking portion to be brought into contact with the mating connector; and
        an operating portion, which is arranged on an opposite side of the locking portion across the rotation shaft, and is capable of operating the switch,
    wherein, when the switching mechanism is located at the first position, the locking lever is rotated so that the operating portion is capable of operating the switch,
    wherein, when the cover-side retaining portion and the switch-side retaining portion are in a non-contact state, the switching mechanism is arranged at the second position, and
    wherein, when the switching mechanism is located at the second position, the operating portion is incapable of operating the switch.

2. An electrical connector according to claim 1, wherein the switching mechanism comprises:
    a movable plate arranged on the switch; and
    a movable-plate-side protrusion formed on the movable plate and serving as the switch-side retaining portion to be brought into contact with the cover, and
    wherein the cover-side retaining portion comprises a cover-side protrusion to be brought into contact with the movable-plate-side protrusion.

3. An electrical connector according to claim 2, further comprising:
    a spring arranged on the movable plate and configured to apply a force to the movable plate from the first position to the second position;
    a stationary plate arranged on the shell and configured to retain the spring; and a movable-plate retaining shaft configured to rotatably retain the movable plate on the shell.

4. An electrical connector according to claim 1, wherein the switch comprises a spring piece, wherein, when the spring piece is pressed by the operating portion, the switch generates the signal capable of establishing the conduction between the electrical connector and the mating connector, and wherein, under a state in which the spring piece is not pressed by the operating portion, the switch one of generates the signal for interrupting the conduction between the electrical connector and the mating connector, and does not generate the signal capable of establishing the conduction between the electrical connector and the mating connector.

5. An electrical connector according to claim 1, wherein the shell has a forcibly releasing jig insertion hole formed in an end portion of the shell on a side opposite to a direction in which the electrical connector is fitted to the mating connector, and wherein the cover is mounted to the shell so as to cover the forcibly releasing jig insertion hole, and is dismountable from the shell by being moved in a direction opposite to the direction in which the electrical connector is fitted to the mating connector.

6. An electrical connector according to claim 5, wherein, when the cover-side retaining portion and the switch-side retaining portion are in a non-contact state, the locking lever is located at a position at which the locking lever is visually recognizable through the forcibly releasing jig insertion hole.

7. An electrical connector according to claim 2, wherein the movable plate comprises a guide portion serving as a guide when the switching mechanism is moved from the second position to the first position, and wherein the shell has a returning hole that enables the guide portion to be visually recognized from the outside of the shell when the switching mechanism is located at the second position.

8. A returning jig, comprising:

an insertion portion having a shaft shape to be inserted into the returning hole of the electrical connector of claim 7; and a plate-like key portion, which is formed at a distal end portion of the insertion portion so as to protrude in a radial direction of the insertion portion, and is configured to be brought into contact with the guide portion when inserted into the returning hole, wherein, under a state in which the switching mechanism is located at the second position, the insertion portion is inserted into the returning hole so that the plate-like key portion is brought into contact with the guide portion, and wherein the plate-like key portion is rotated to press the guide portion toward the first position so that the switching mechanism is arrangeable at the first position.

* * * * *